US006993829B2

(12) United States Patent
Kobayashi et al.

(10) Patent No.: US 6,993,829 B2
(45) Date of Patent: Feb. 7, 2006

(54) METHOD FOR PRODUCING CENTRALIZED DISTRIBUTION UNIT OF THIN BRUSHLESS MOTOR FOR VEHICLE

(75) Inventors: Makoto Kobayashi, Yokkaichi (JP); Izumi Suzuki, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 383 days.

(21) Appl. No.: 10/281,105

(22) Filed: Oct. 28, 2002

(65) Prior Publication Data

US 2003/0173841 A1 Sep. 18, 2003

(30) Foreign Application Priority Data

Oct. 26, 2001 (JP) ............................ 2001-330030

(51) Int. Cl.
*H01H 11/00* (2006.01)
*H01H 11/02* (2006.01)
*H01H 11/04* (2006.01)
*H01H 65/00* (2006.01)

(52) U.S. Cl. ............................ 29/622; 29/596; 29/825; 310/71; 310/179; 336/192

(58) Field of Classification Search .................. 29/622, 29/596, 825; 310/71, 179; 336/192
See application file for complete search history.

(56) References Cited

U.S. PATENT DOCUMENTS

| | | | | |
|---|---|---|---|---|
| 5,828,147 | A * | 10/1998 | Best et al. | 310/71 |
| 6,369,473 | B1 * | 4/2002 | Baumeister et al. | 310/71 |
| 6,856,057 | B2 | 10/2002 | Kobayashi et al. | |
| 6,894,410 | B2 | 10/2002 | Kobayashi et al. | |
| 6,930,418 | B2 | 10/2002 | Kobayashi et al. | |
| 6,600,244 | B2 * | 7/2003 | Okazaki et al. | 310/71 |
| 6,664,678 | B2 * | 12/2003 | Shimizu | 310/71 |

FOREIGN PATENT DOCUMENTS

JP A 2000-197311 7/2000

* cited by examiner

*Primary Examiner*—A. Dexter Tugbang
*Assistant Examiner*—Tim Phan
(74) *Attorney, Agent, or Firm*—Oliff & Berridge, PLC

(57) ABSTRACT

In a method of producing a centralized distribution unit of a thin brushless motor for a vehicle having superior water-proof-ness and airtight-ness functions, and high dielectric strength, an insulating holder is provided with bearing recesses. Bus bars are bent from a substantially linear shape into a substantially annular shape, and inserted into holding grooves formed in the insulating holder. The insulating holder and bus bars are disposed in a molding cavity, and distal ends of holder supports that project from an inner wall of the molding cavity are engaged with the bearing recesses of the insulating holder. Resin is supplied into the molding cavity to form an insulation layer that covers the bus bars and an entire periphery of the insulating holder.

8 Claims, 27 Drawing Sheets

METHOD FOR PRODUCING CENTRALIZED DISTRIBUTION UNIT OF THIN BRUSHLESS MOTOR FOR VEHICLE

CROSS REFERENCE TO RELATED DOCUMENT

This application claims priority to Japanese Patent Application No. 2001-330030, filed on Oct. 26, 2001, which is incorporated herein by reference in its entirety.

BACKGROUND OF THE INVENTION

1. Field of Invention

This invention relates to a method for producing a centralized distribution unit to be used for providing a central distribution to stator windings of a thin brushless motor for a vehicle.

2. Description of Related Art

Recently, automobiles with good fuel economy have been in high demand. As one example of automobile manufacturers' efforts to meet these demands, hybrid cars with super low fuel consumption have been developed. In particular, a hybrid car has been proposed recently which is provided with an auxiliary power mechanism (a motor assist mechanism) in which an engine provides the main power and a DC brushless motor assists the engine upon acceleration or the like.

The motor assist mechanism is subject to much constraint in installation, since a brushless motor constituting the motor assist mechanism is disposed in a limited space, for example, a space between an engine and a transmission in an engine compartment. Thus, such a brushless motor is required to have a thin configuration.

A thin brushless motor to be used in the motor assist mechanism of a vehicle includes a rotor directly connected to a crankshaft of the engine, and a ring-like stator enclosing the rotor. The stator includes many magnetic poles that have windings on cores, a stator holder that contains the magnetic poles, and a centralized distribution unit that concentratedly distributes currents to the windings.

For convenience of explanation, a prior art centralized distribution unit to be used in a three-phase DC brushless motor will be described with reference to FIGS. 33A and 33B. FIG. 33A is perspective view of ring-like bus bars. FIG. 33B is a plan view of a conductive metallic plate from which the ring-like bus bars are to be punched out.

The centralized distribution unit, as shown in FIG. 33A, includes three ring-like bus bars 101, 102, and 103. Each of the ring-like bus bars 101, 102, and 103 includes a ring-like body 104, a terminal portion 105 projecting outwardly in a radial direction on an outer periphery of the ring-like body 104, and a plurality of tabs 106 each projecting inwardly in the radial direction on an inner periphery of the ring-like body 104. Each terminal portion 105 is electrically connected through an electric wire to a battery while each tab 106 is electrically connected through a respective electric wire to an end of a respective winding. When the three ring-like bus bars 101, 102, and 103 are energized, currents are concentratedly distributed to the windings corresponding to a U phase, a V phase, and a W phase. Consequently, the motor is driven.

SUMMARY OF THE INVENTION

However, as shown in FIG. 33B, since the prior art centralized distribution unit was produced by punching a sheet material into the ring-like bus bars 101, 102, and 103 corresponding to the three phases by using individual dies, respectively, there was much loss of material. The inventors have proposed a process for producing a new centralized distribution unit by utilizing bus bars punched out into strip-like blanks.

In order to produce the new centralized distribution unit, firstly, a bus bar body, a terminal portion, and tabs are formed integrally together by a press apparatus. Secondly, the terminal portions and all bus bars are bent. Thirdly, the bent bus bars are contained in holding grooves in a ring-like insulating holder. Fourthly, each bus bar and the insulating holder are disposed in a molding cavity in an insert-molding mold and a resin is supplied into the molding cavity. Consequently, the respective bus bars and insulating holder are covered entirely by a resin insulation layer.

However, since the resin is applied under pressure to the insulating holder during insert molding in the proposed process, the insulating holder tends to be displaced in the molding cavity. This will partially thin the resin insulation layer. This makes it difficult to provide superior waterproof-ness and airtight-ness functions, and thus a desired dielectric strength, to the centralized distribution unit.

An object of the present invention is to provide a method for producing a centralized distribution unit of a thin brushless motor for a vehicle that has superior waterproof-ness and airtight-ness functions, and a high dielectric strength.

In order to achieve the above object, the present invention provides a method for producing a centralized distribution unit of a thin brushless motor for a vehicle wherein the centralized distribution unit is formed into a ring configuration and can concentratedly distribute currents to stator windings, and wherein the centralized distribution unit comprises a plurality of bus bars each of which includes a terminal portion to be connected to a battery and tabs to be connected to the stator windings and is provided in conjunction with a phase of the motor, an insulating holder having holding grooves for holding the respective bus bars with the bus bars being spaced away from each other at a given distance, and a resin insulation layer, formed by insert molding, that covers the bus bars and the insulating holder. The method comprises the steps of: providing bearing recesses in a bottom surface of the insulating holder beforehand; disposing the insulating holder and bus bars in a molding cavity in an insert-molding mold; engaging distal ends of holder supports projecting from an inner wall of a lower mold member with the bearing recesses; and supplying a resin for forming the resin insulation layer into the molding cavity.

Since the insulating holder is secured to a proper position in the molding cavity during insert molding, it is possible to prevent the resin insulation layer from being partially thinned and to form the resin insulation layer having a given thickness at the respective portion. Accordingly, it is possible for the present invention to reliably produce a centralized distribution unit of a thin brushless motor for a vehicle that has superior waterproof-ness and airtight-ness functions and a high dielectric strength.

The holder supports are preferably holder support pins having tapered ends. Such a configuration of the holder support pins serves to make the insulating holder hard to move, thereby positively fixing the insulating holder at the given position in the molding cavity. Consequently, it is possible to prevent the insulating holder from being displaced in the cavity during insert molding and to reliably prevent the resin insulation layer from being partially thinned. This will make it further possible to produce a centralized distribution unit having superior waterproof-ness and airtight-ness functions.

The bearing recesses are preferably enclosed by ribs projecting from the bottom surface, and each of said ribs is preferably provided with a notch. Since the ribs define a certain space between the bottom surface of the holder and the lower mold member, the resin will flow over the whole bottom surface, thereby realizing reliable insert molding. Also, since the resin can flow into the recesses through the notches formed in the ribs, the recessed are filled with the resin. Accordingly, it is further possible to produce a centralized distribution unit having superior waterproof-ness and airtight-ness functions.

BRIEF DESCRIPTION OF THE DRAWINGS

The foregoing and other features of the present invention will become apparent to one skilled in the art to which the present invention relates upon consideration of the invention with reference to the accompanying drawings, wherein.

DETAILED DESCRIPTION OF PREFERRED EMBODIMENTS

Figure 1:
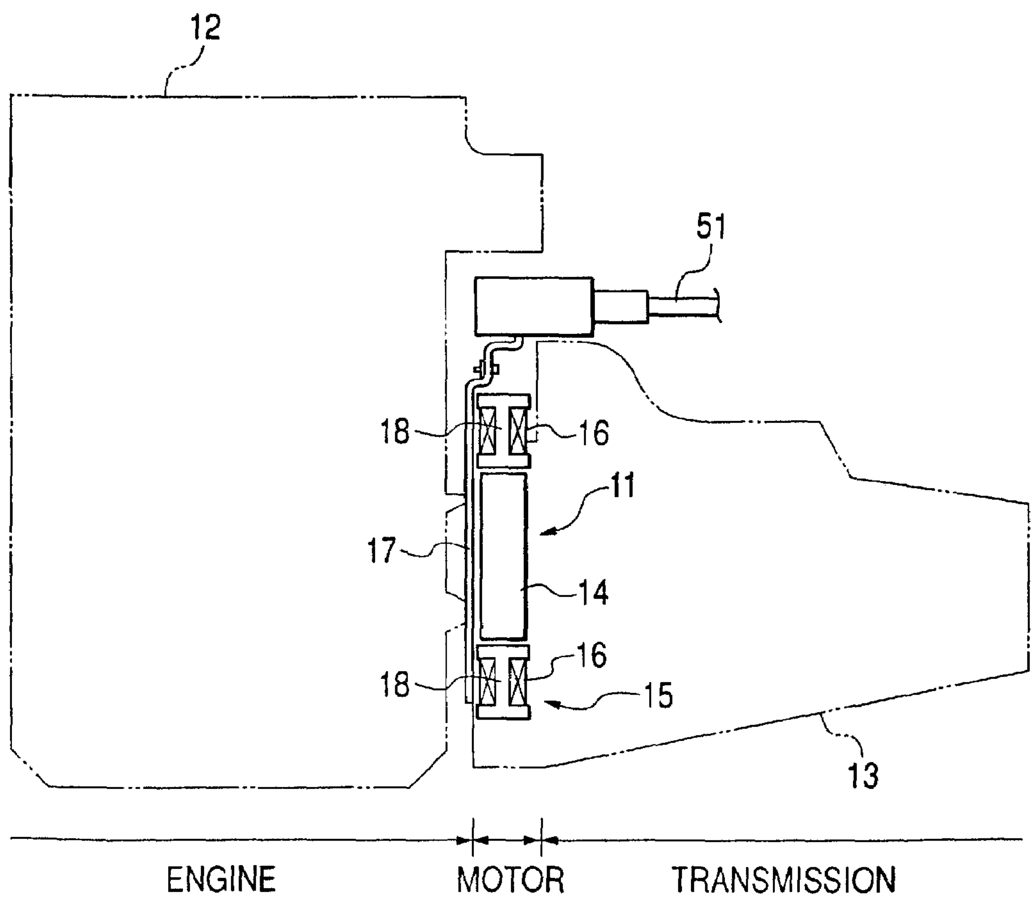
FIG. 1 is a schematic side elevation view of a thin brushless motor.

Referring now to the drawings, an exemplary embodiment of a method for producing a centralized distribution unit of a thin brushless motor for a vehicle in accordance with the present invention will be described below.

As shown in FIG. 1, a three-phase thin DC brushless motor 11 to be used in a hybrid automobile is disposed between an engine 12 and a transmission 13. The thin DC brushless motor 11 includes a rotor 14 connected, e.g., directly connected, to a crankshaft of the engine 12, and a ring-like stator 15 enclosing the rotor 14. The stator 15 includes a plurality of magnetic poles that have windings 16 on cores, a stator holder 18 that contains the magnetic poles, and an annular centralized distribution unit 17 that concentratedly distributes currents to the windings 16.

Figure 2:
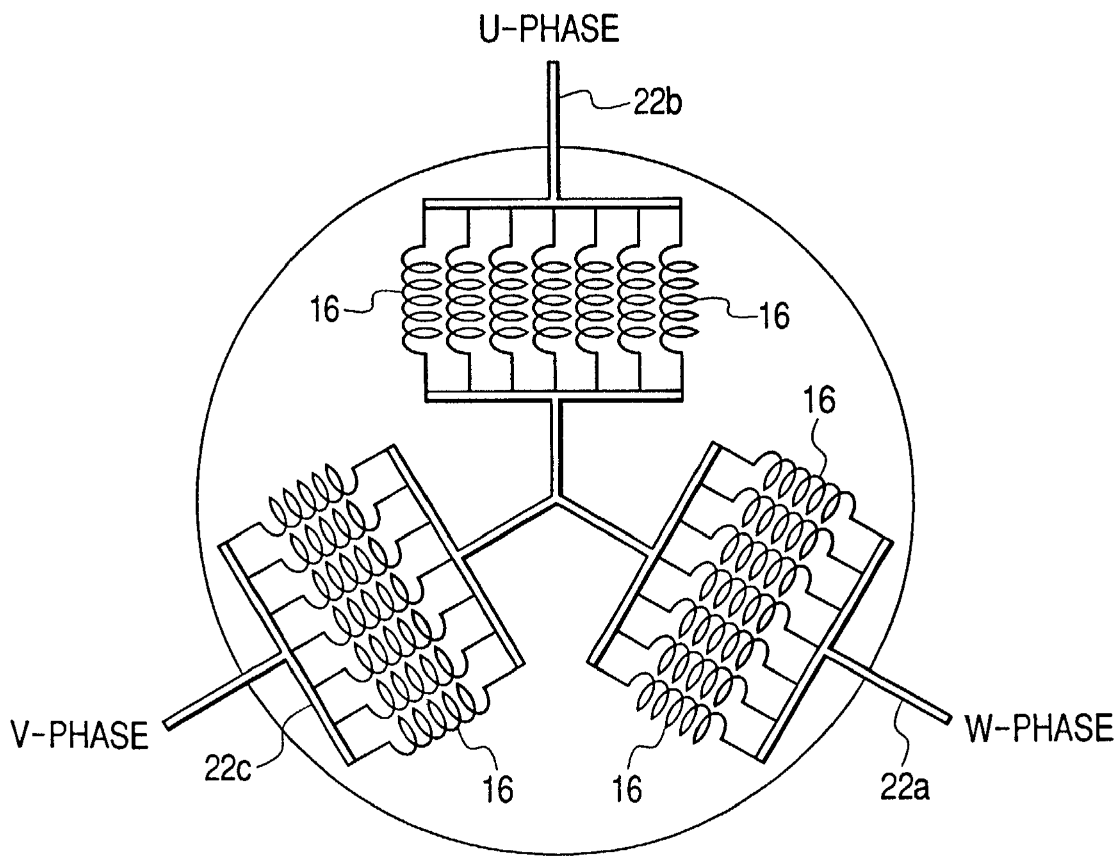
FIG. 2 is a schematic wiring diagram of the thin brushless motor.
Figure 3:
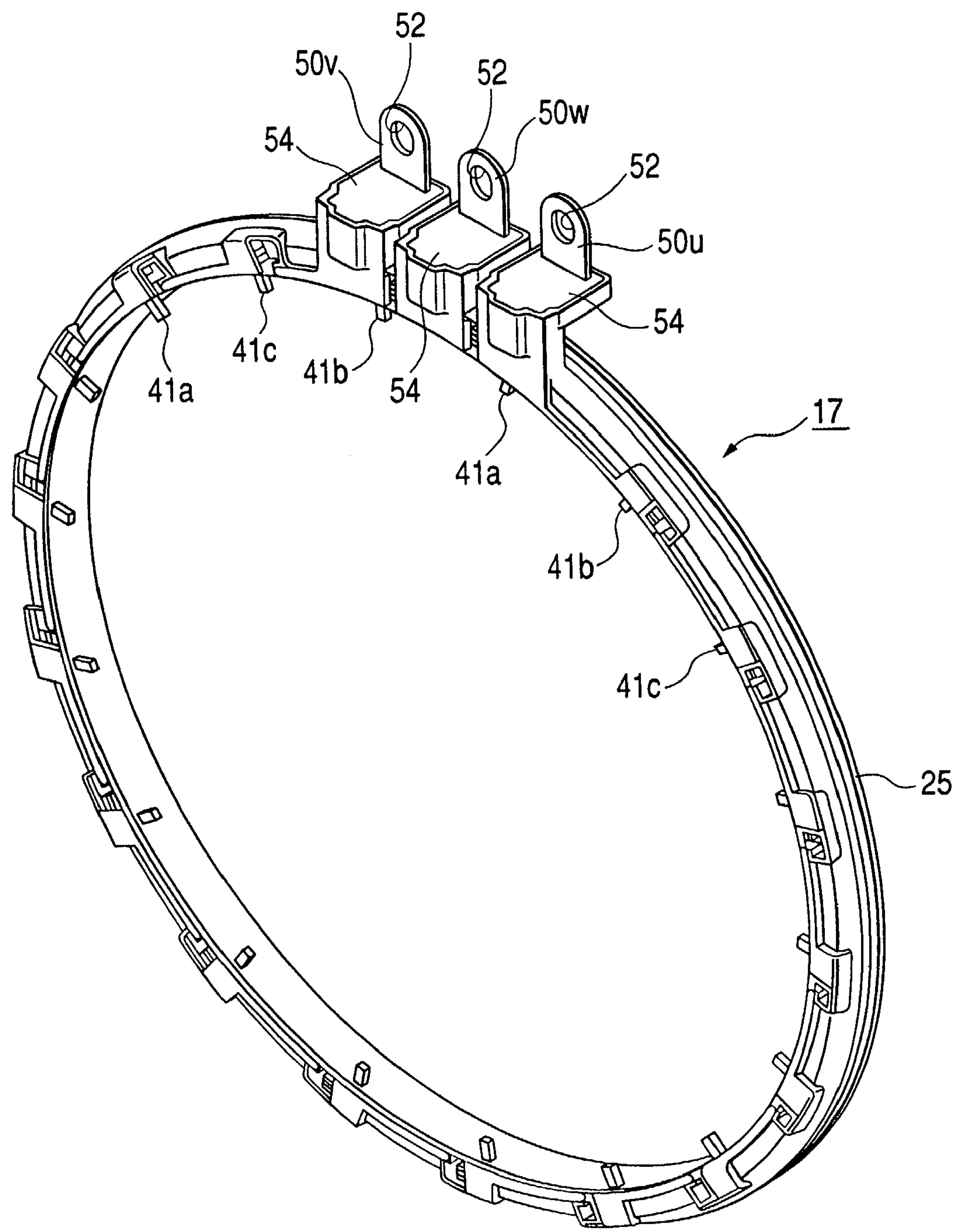
FIG. 3 is a perspective view of a centralized distribution unit.
Figure 4:
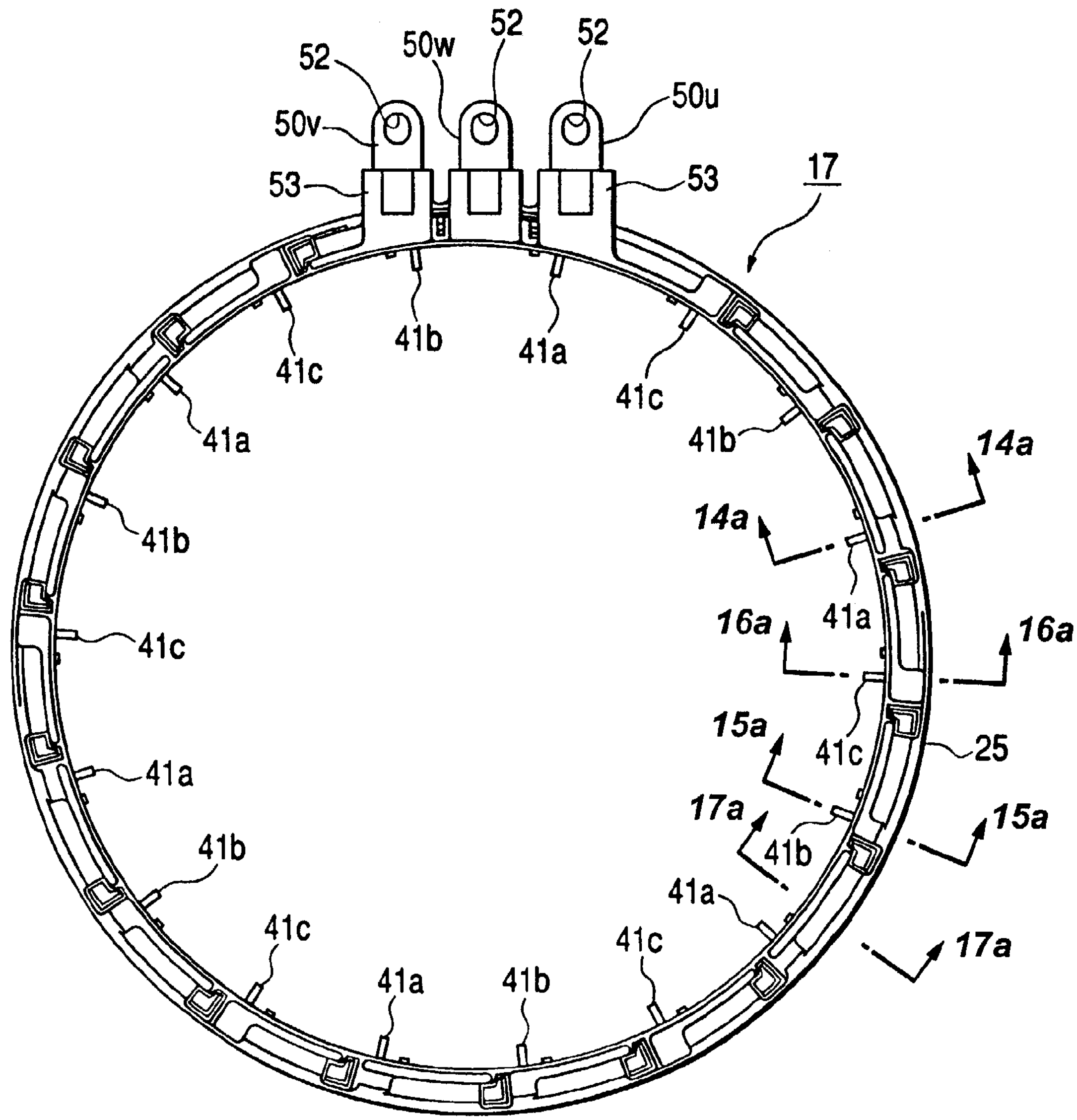
FIG. 4 is a front elevation view of the centralized distribution unit.
Figure 5:
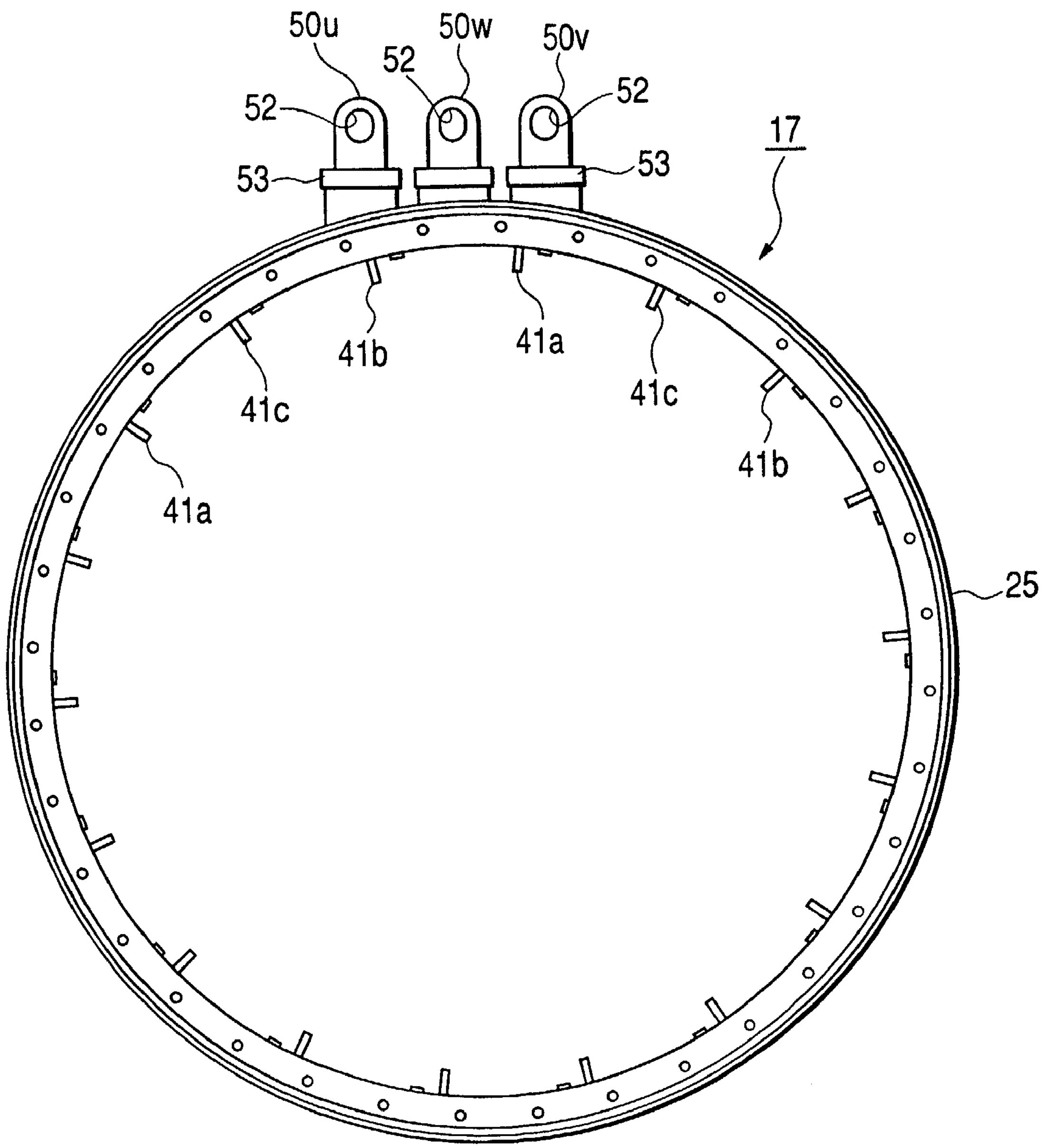
FIG. 5 is a rear elevation view of the centralized distribution unit.

FIG. 2 shows a schematic diagram of the stator 15. As shown in FIG. 2, an end of each phase winding 16 is connected to one of bus bars 22*a*, 22*b*, and 22*c* formed in the centralized distribution unit 17 while the other end is connected to a ring-like conductive member (not shown).

As shown in FIGS. 3 to 6, a continuous annular insulating holder 21 (FIGS. 6A and 6B) made of synthetic resin is embedded in the centralized distribution unit 17. The insulating holder 21 may be made of, for example, PBT (polybutyrene terephthalate), PPS (polyphenylene sulfide), or the like.

In this embodiment, the insulating holder 21 is made of a PPS containing a glass fiber of 40% by weight. The reason why the insulating holder 21 is made of such a material is that the material is superior in its electrical properties (dielectric strength). In particular, in the thin DC brushless motor 11 in the present embodiment, since voltages to be applied to the respective phase bus bars 22*a*, 22*b*, and 22*c* are high, it is important to maintain the dielectric strength in the respective bus bars 22*a*, 22*b*, and 22*c*. The dielectric strength in this case is required to be above 2000V. In addition, PPS has a high mechanical strength as well as a high heat resistance in comparison with a common resin such as a PP (polypropylene) or the like.

Figure 8:
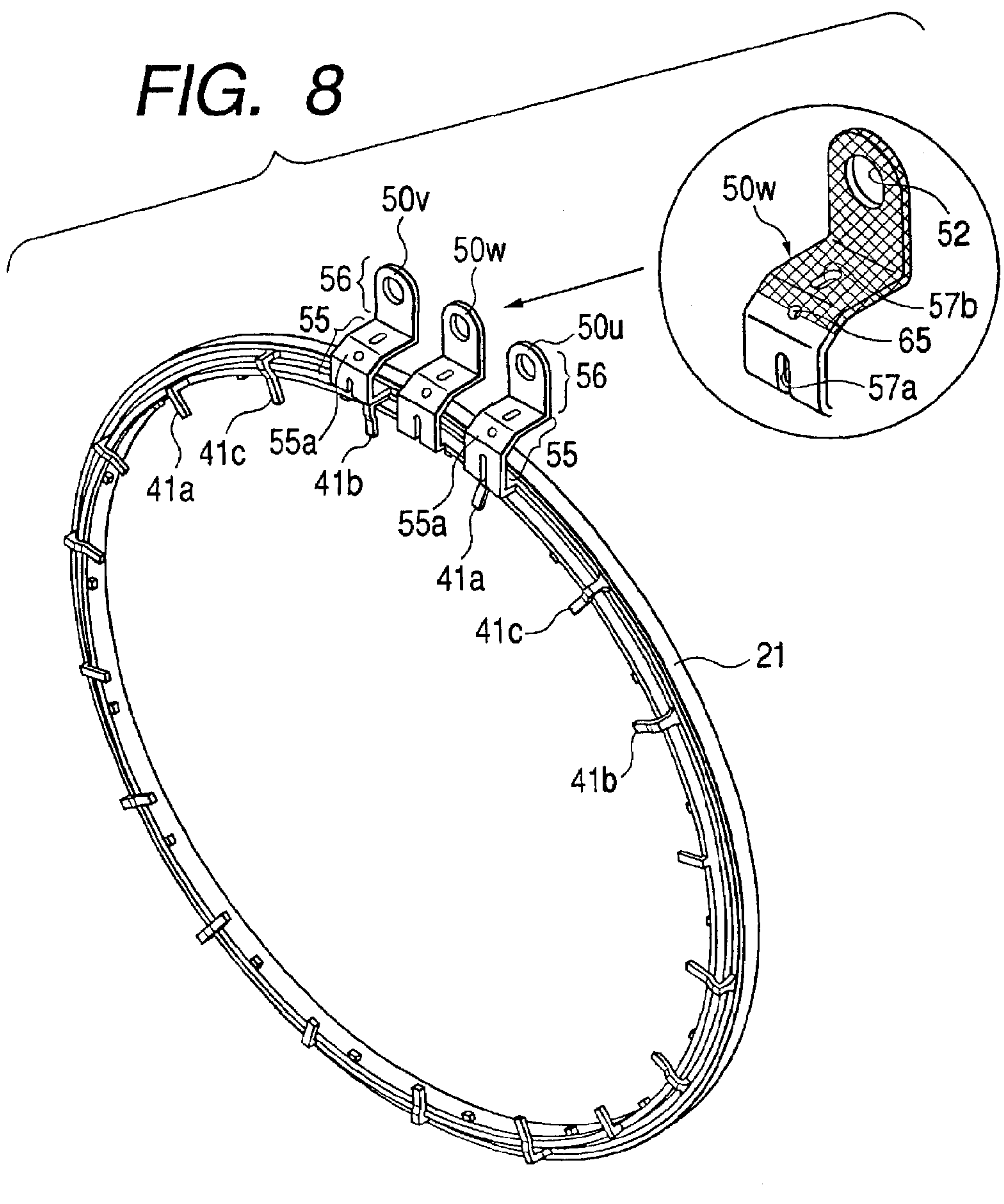
FIG. 8 is a perspective view of an insulating holder.
Figure 9:
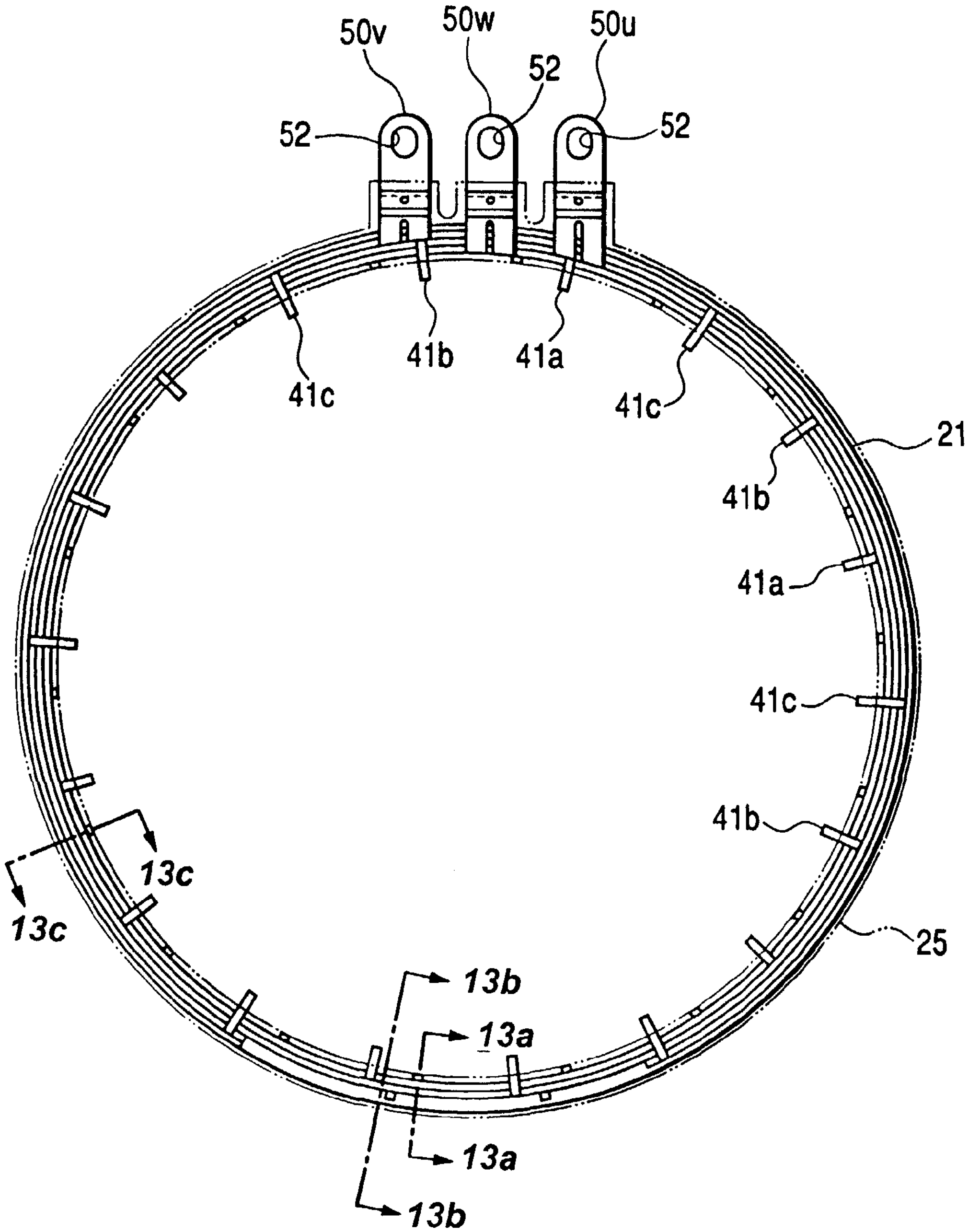
FIG. 9 is a front elevation view of the insulating holder in which bus bars are inserted.
Figure 10:
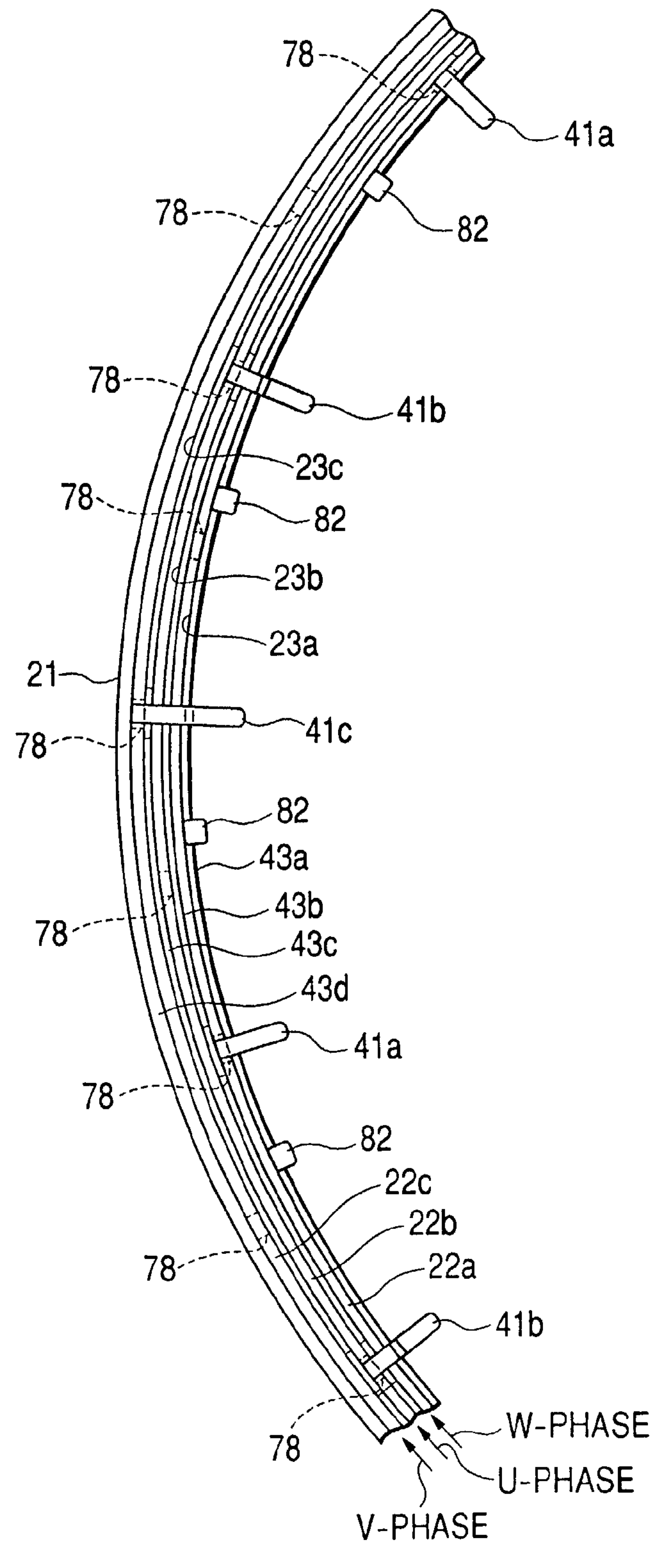
FIG. 10 is an enlarged front elevation view of a part of the insulating holder.

As shown in FIGS. 8, 9, and 10, the insulating holder 21 is provided on one side with holding grooves 23*a*, 23*b*, and 23*c* extending in the circumferential direction. The holding grooves 23*a*, 23*b*, and 23*c* are disposed in parallel at a given distance in the radial direction of the insulating holder 21. The bus bars 22*a*, 22*b*, and 22*c* corresponding to the respective phases are individually inserted into the respective holding grooves 23*a*, 23*b*, and 23*c*, respectively. The respective bus bars 22*a*, 22*b*, and 22*c* are stacked on each other in the radial direction of the centralized distribution unit 17 with the bus bars being spaced from each other at a given distance. Accordingly, the respective holding grooves 23*a*, 23*b*, and 23*c* serve to hold the respective bus bars 22*a*, 22*b*, and 22*c* in the precise positions. The insulating holder 21 and bus bars 22*a*, 22*b*, and 22*c* are entirely covered with a resin insulation layer 25. This covering accomplishes individual insulation between the respective bus bars 22*a*, 22*b*, and 22*c*.

The resin insulation layer 25 is made of a PPS containing a glass fiber, similar to the insulating holder 21. The reason why this material is used in the resin insulation layer 25 is that the material is superior in its electric properties (dielectric strength), heat resistance, and mechanical strength, similar to the reason it is used in the insulating holder 21. The material in the resin insulation layer 25 utilizes a synthetic resin.

In this embodiment, the bus bar 22*a* at the inside layer corresponds to a W phase, the bus bar 22*b* at the intermediate layer to a U phase, and the bus bar 22*c* at the outside layer to a V phase, respectively. For convenience of explanation, the W phase bus bar 22*a* is referred to as the "inside bus bar 22*a*" hereinafter, the U phase bus bar 22*b* as the "intermediate bus bar 22*b*," and the V phase bus bar 22*c* as the "outside bus bar 22*c*," respectively.

The respective bus bars 22*a*, 22*b*, and 22*c* will be explained below. The respective bus bars 22*a*, 22*b*, and 22*c* are formed beforehand by punching out a conductive metallic plate made of a copper or a copper alloy into a strip-like blank using a press apparatus, and bending the blank in the thickness direction to form a discontinuous annular configuration from which a part of an arc is removed (substantially a C-shape). The diameters of the respective bus bars 22*a*, 22*b*, and 22*c* are set to be larger in order from the inside layer to the outside layer. The formed respective bus bars 22*a*, 22*b*, and 22*c* are inserted into the respective holding grooves 23*a*, 23*b*, and 23*c*. This makes it easy to assemble the respective bus bars 22*a*, 22*b*, and 22*c* in the insulating holder 21.

As shown in FIGS. 8 to 11, the respective bus bars 22*a*, 22*b*, and 22*c* are provided with respective pluralities of projecting tabs 41*a*, 41*b*, and 41*c* to which the respective windings 16 are connected. The respective tabs 41*a*, 41*b*, and 42*c* are punched out from the conductive metallic plate simultaneously when the respective bus bars 22*a*, 22*b,* and 22*c* are punched out from the plate by the press apparatus. Consequently, the respective bus bars 22*a*, 22*b*, and 22*c* and the respective tabs 41*a*, 41*b*, and 41*c* are formed integrally together as one piece by a single pressing step. This simplifies the production process in comparison with a process in which the respective tabs 41*a*, 41*b*, and 41*c* are coupled to the respective bus bars 22*a*, 22*b*, and 22*c* by welding.

Figure 11:
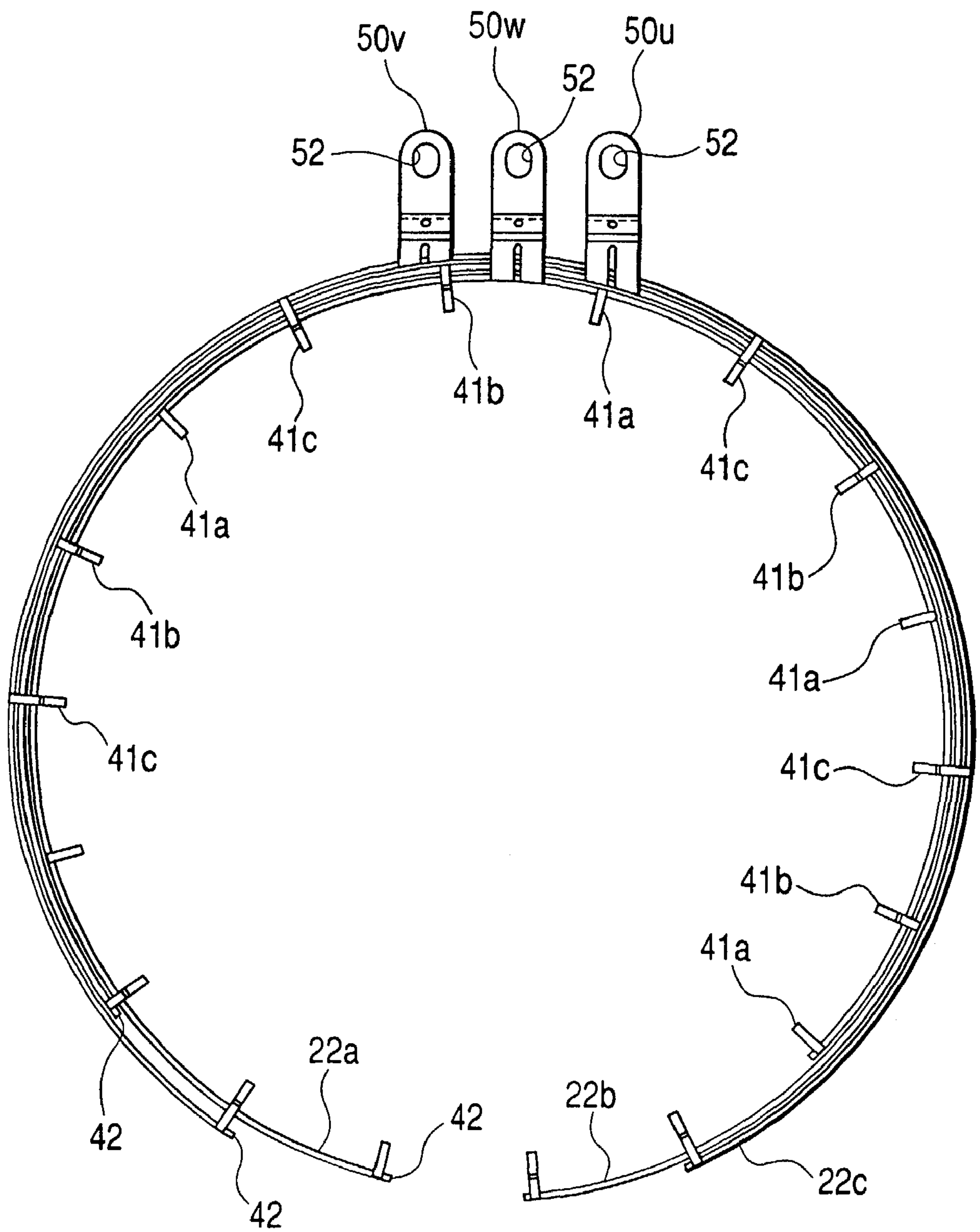
FIG. 11 is a front elevation view of bus bars from which the insulating holder is omitted.

Six of each of tabs 41*a*, 41*b*, and 41*c* are provided on the respective bus bars 22*a*, 22*b*, and 22*c*. The respective tabs 41*a*, 41*b*, and 41*c* in the respective phase are arranged at an even angular distance (i.e., 60 degrees with respect to the center) in the circumferential direction of the respective bus bars 22*a*, 22*b*, and 22*c*. Removed portions 42 of the respective bus bars 22*a*, 22*b*, and 22*c* are displaced from each other by an angle of 20 degrees in the circumferential direction. Consequently, eighteen of the tabs 41*a* to 41*c* in total are arranged at an even angular distance of 20 degrees with respect to the center in the circumferential direction of the centralized distribution unit 17. As shown in FIG. 11, in the present embodiment, in the case where the removed portion 42 of the outside bus bar 22*c* is set to be a reference, the intermediate bus bar 22*b* is arranged away from the reference by +20 degrees in the clockwise direction. Meanwhile, the inside bus bar 22*a* is arranged away from the reference by −20 degrees in the counterclockwise direction.

The respective tabs 41*a*, 41*b*, and 41*c* of the respective bus bars 22*a*, and 22*b*, and 22*c* are bent into L-shapes in cross section to direct the distal ends of them to the center of the centralized distribution unit 17.

Each distal end of the respective tabs 41*a*, 41*b*, and 41*c* projects inwardly in the radial direction from the inner periphery of the centralized distribution unit 17. Each winding 16 is connected to a respective projecting portion. The respective tabs 41*a*, 41*b,* and 41*c* are different in length. The distal end of each of the respective tabs 41*a*, 41*b*, and 41*c* is arranged on the same distance from the center of the centralized distribution unit 17. Accordingly, the respective tabs 41*a*, 41*b*, and 41*c* of the respective bus bars 22*a*, 22*b*, and 22*c* are longer in length in the radial direction of the centralized distribution unit in order from the inside bus bar 22*a* to the outside bus bar 22*c*.

Figure 15B:
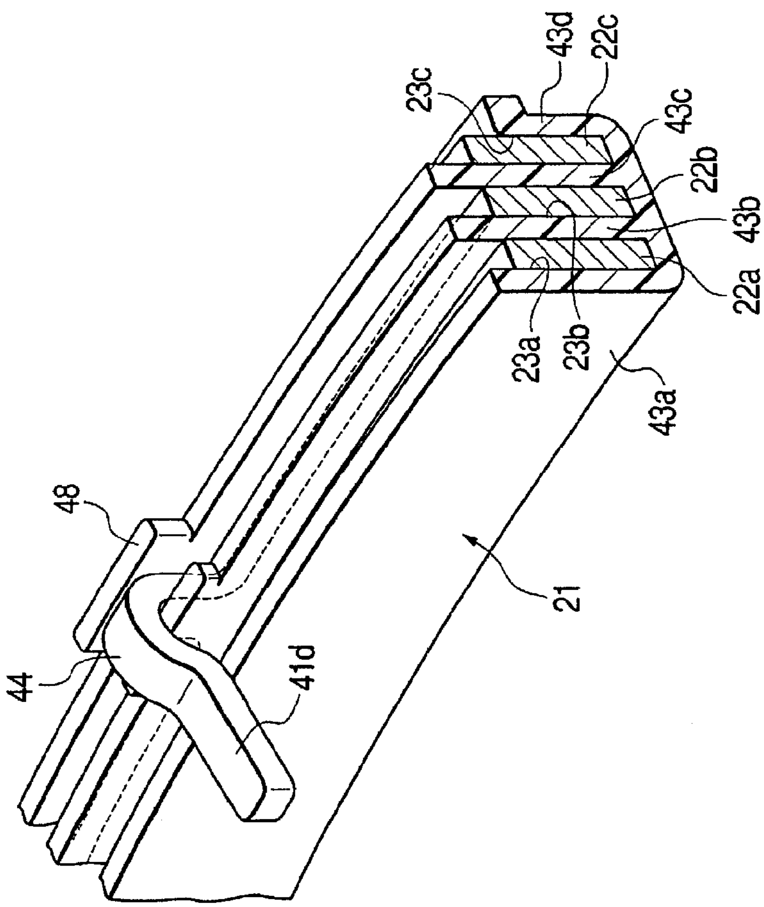
FIG. 15B is a perspective view of the centralized distribution unit shown in FIG. 15A.
Figure 15A:
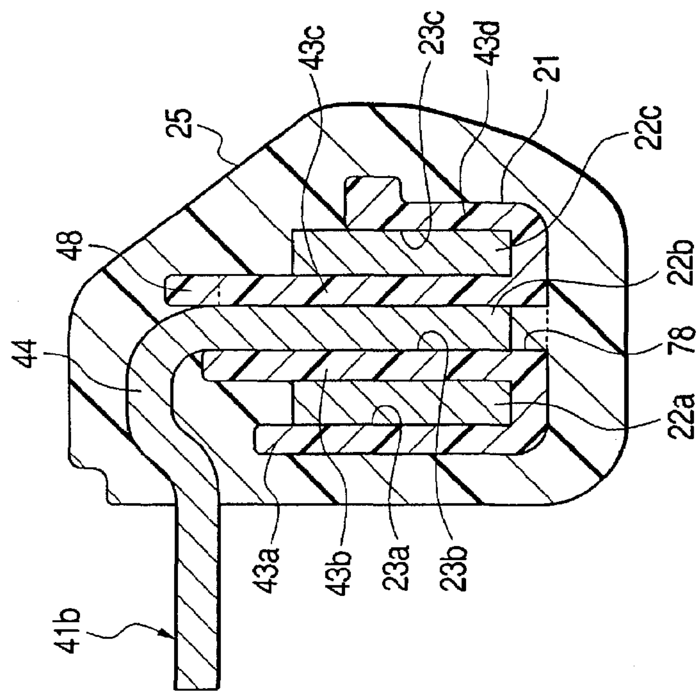
FIG. 15A is a cross sectional view of the centralized distribution unit taken along line 15*a*—15*a* in FIG. 4.

As shown in FIGS. 15A and 15B, the tabs 41*b* of the intermediate bus bar 22*b* are, at the section covered by the resin insulation layer 25, provided with a curved portion 44 raised in the height direction of the walls 43*a*, 43*b*, 43*c*, and 43*d* that define the holding grooves 23*a*, 23*b*, and 23*c*. The curved portion 44 goes around the top side of the inside bus bar 22*a* (i.e., another bus bar) in the resin insulation layer 25. The curved portion 44 can provide an increased distance between the tabs 41*b* and the adjacent bus bar.

Figure 16B:
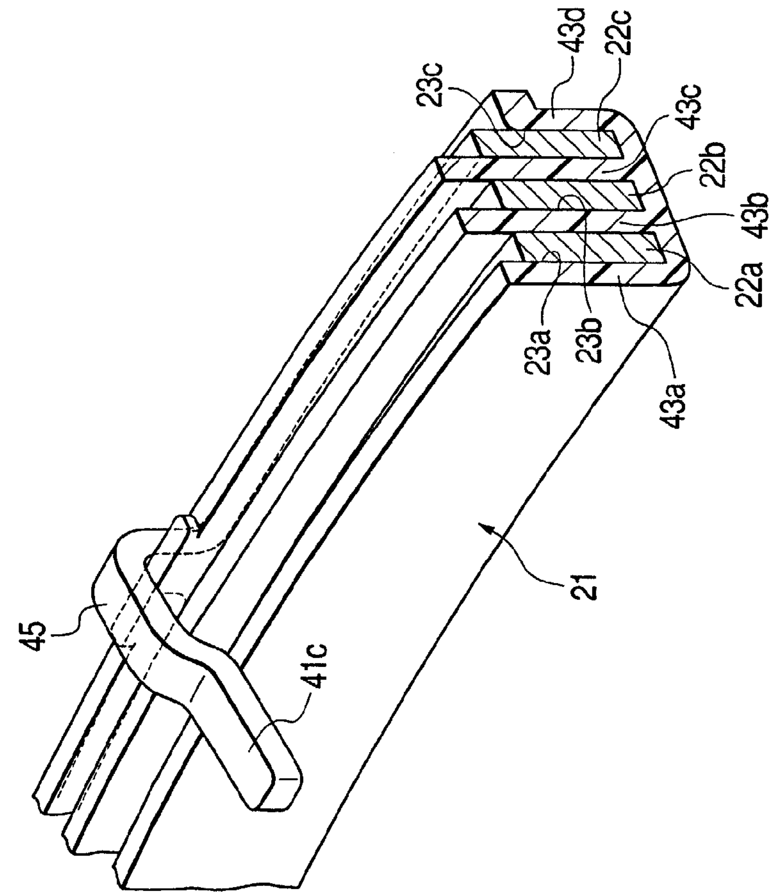
FIG. 16B is a perspective view of the centralized distribution unit shown in FIG. 16A.
Figure 16A:
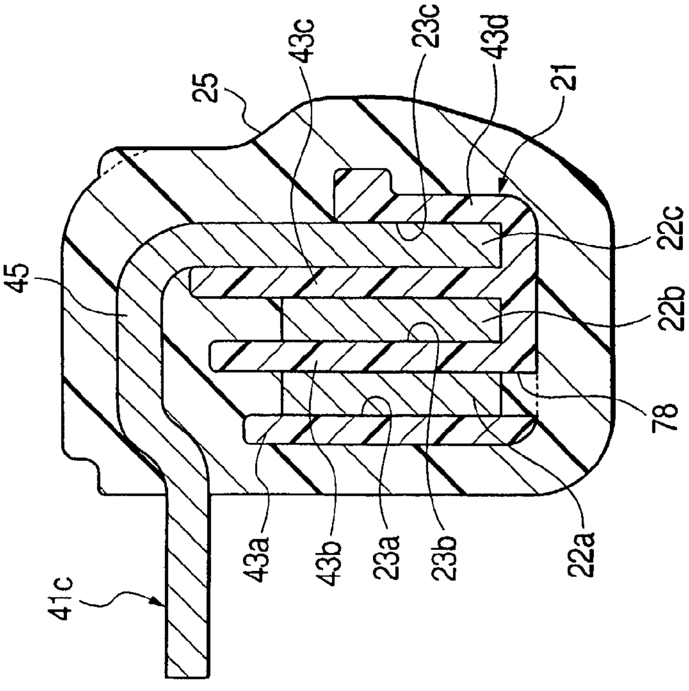
FIG. 16A is a cross sectional view of the centralized distribution unit taken along line 16*a*—16*a* in FIG. 4.
Figure 17A:
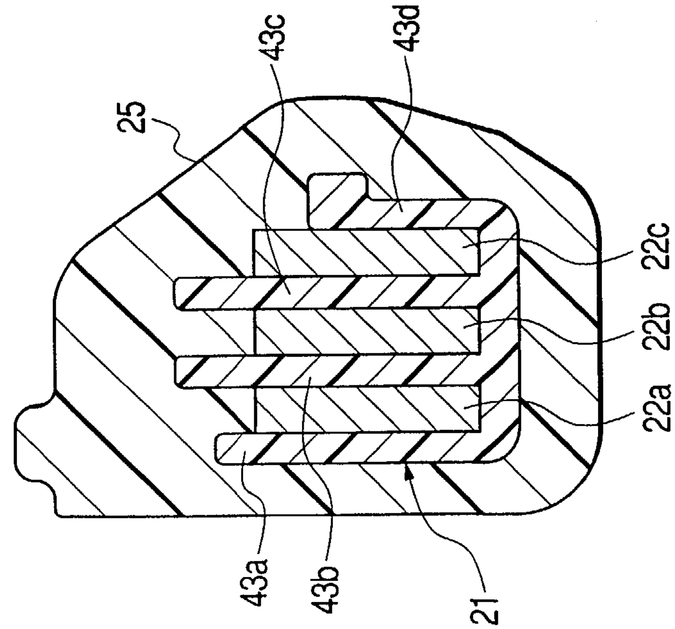
FIG. 17A is a cross sectional view of the centralized distribution unit taken along line 17*a*—17*a* in FIG. 4.
Figure 17B:
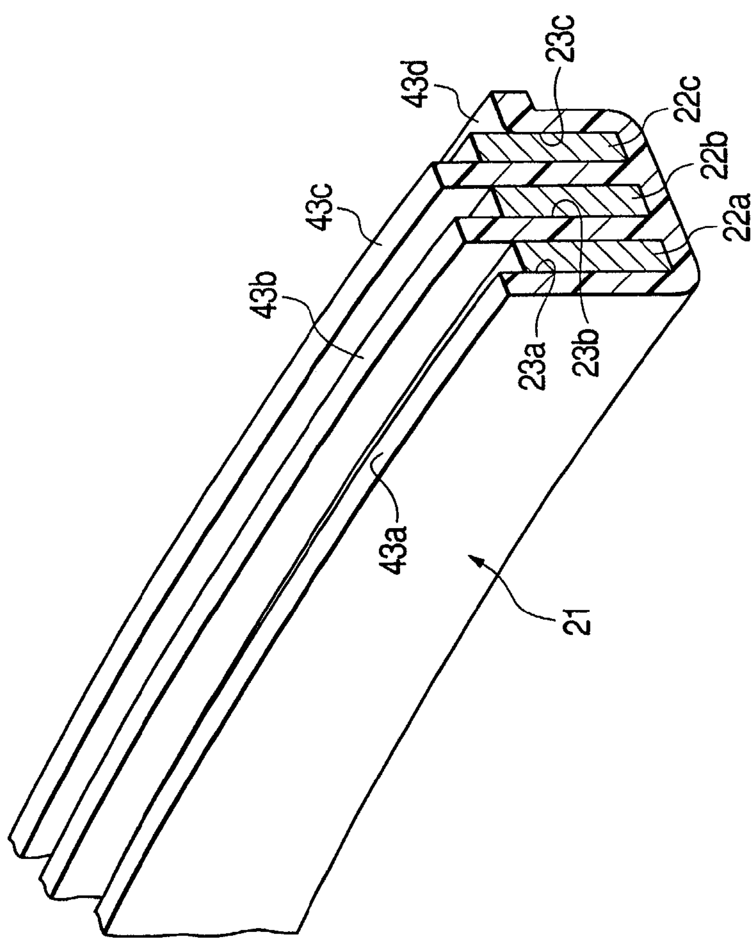
FIG. 17B is a perspective view of the centralized distribution unit shown in FIG. 17A.

As shown in FIGS. 16A and 16B, the tabs 41*c* of the outside bus bar 22*c* are, at the section covered by the resin insulation layer 25 provided with a curved portion 45 raised in the height direction of the walls 43*a* to 43*d*. The curved portion 45 goes around the top sides of the intermediate bus bar 22*b* as well as the inside bus bar 22*a* (i.e., other bus bars) in the resin insulation layer 25. The curved portion 45 can provide an increased distance between the tabs 41*c* and the adjacent bus bars. Since the curved portion 45 goes around two bus bars 22*a* and 22*b*, the curved portion 45 is longer than the curved portion 44 of the tab 41*b* on the intermediate bus bar 22*b*.

Figure 14B:
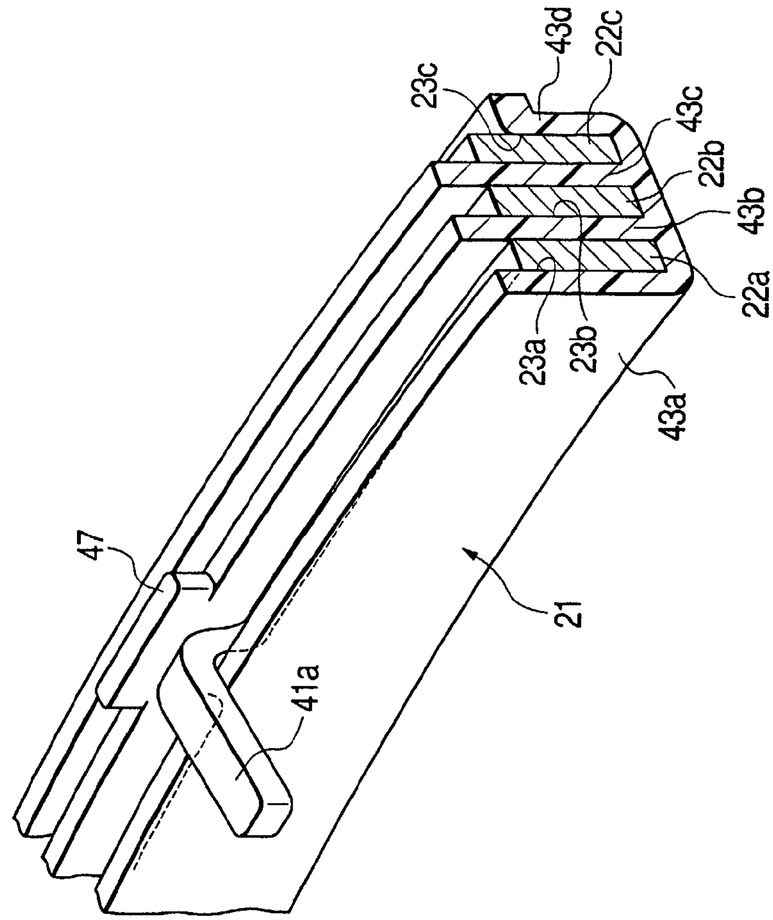
FIG. 14B is a perspective view of the centralized distribution unit shown in FIG. 14A.
Figure 14A:
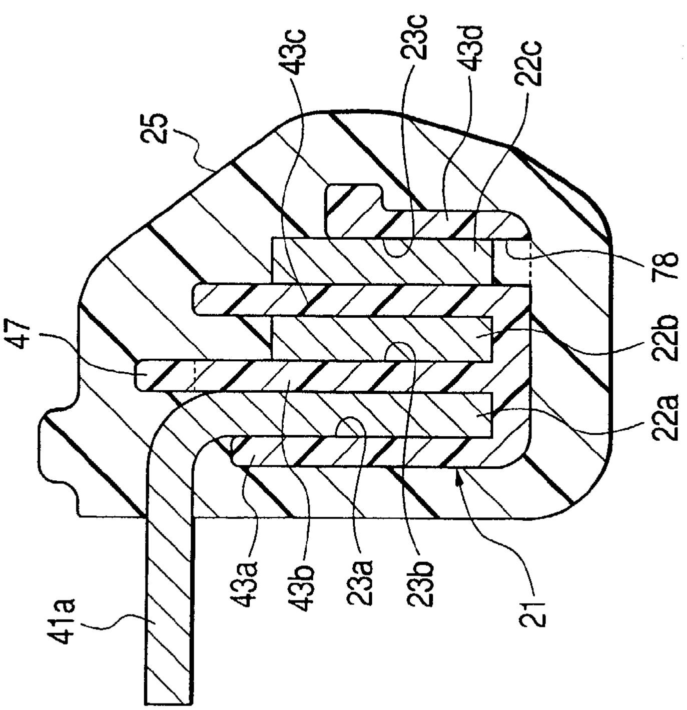
FIG. 14A is a cross sectional view of the centralized distribution unit taken along line 14*a*—14*a* in FIG. 4.

As shown in FIGS. 14A and 14B, the tabs 41*a* of the inside bus bar 22*a* have no curved portion on the proximal end, but rather have a right-angled portion. The tabs 41*a* are not required to be at an increased distance, since there is no adjacent bus bar for the tabs to go around.

As shown in FIGS. 14A and 14B, inside projecting pieces 47 are formed integrally with wall 43*b*, and are positioned between tab forming sections of the inside bus bar 22*a* from tab non-forming sections of the intermediate bus bar 22*b* adjacent the inside bus bar 22*a*. The inside projecting pieces 47 can provide an increased creepage distance between the inside bus bar 22*a* and the intermediate bus bar 22*b* adjacent the inside bus bar 22*a*. Six inside projecting pieces 47 in total, made of a synthetic resin, are provided on the wall 43*b* and arranged at an even spacing in the circumferential direction of the insulating holder 21. The respective inside projecting pieces 47 correspond in position to the respective tabs 41*a* formed on the inside bus bar 22*a*. The portions of wall 43*b* having the inside projecting pieces 47 are higher than the portions of wall 43*b* that space the tab non-forming sections of the inside bus bar 22*a* and intermediate bus bar 22*b*.

As shown in FIGS. 15A and 15B, an outside projecting piece 48 is formed integrally with wall 43*c* that spaces a tab forming section of the intermediate bus bar 22*b* from a tab non-forming section of the outside bus bar 22*c* adjacent the intermediate bus bar 22*b*. The outside projecting piece 48 can provide an increased distance between the intermediate bus bar 22*b* and the outside bus bar 22*c* adjacent the intermediate bus bar 22*b*. Six outside projecting pieces 48 in total, made of a synthetic resin, are provided on the wall 43*c* and arranged at an even spacing in the circumferential direction of the insulating holder 21. The respective outside projecting pieces 48 correspond to the respective tabs 41*b* formed on the intermediate bus bar 22*b*. The portions of wall 43*c* having the outside projecting piece 48 are higher than the portions of wall 43*c* that space the tab non-forming sections of the intermediate bus bar 22*b* and outside bus bar 22*c*.

As shown in FIGS. 3 to 7, the respective bus bars 22*a*, 22*b*, and 22*c* are provided on their sides with respective terminal portions 50*w*, 50*u*, and 50*v* formed integrally together with the respective bus bars. The respective terminal portions 50*w*, 50*u*, and 50*v* project outwardly from the resin insulation layer 25. The respective terminal portions 50*w*, 50*u*, and 50*v* are connected through electric power source cables 51 shown in FIG. 1 to a battery (not shown) for the thin DC brushless motor 11. The respective terminal portions 50*w*, 50*u*, and 50*v* are punched out simultaneously when the bus bars 22*a*, 22*b*, and 22*c* are punched out from the conductive metallic plate by a press apparatus. Accordingly, the respective terminal portions 50*w*, 50*u*, and 50*v* are formed integrally together as one piece with the bus bars 22*a*, 22*b*, and 22*c*, respectively, by a single pressing process. This can simplify the production process in comparison with a procedure in which the respective terminal portions 50*u*, 50*v*, and 50*w* are welded to the respective bus bars 22*a*, 22*b*, and 22*c*.

Figure 6A:
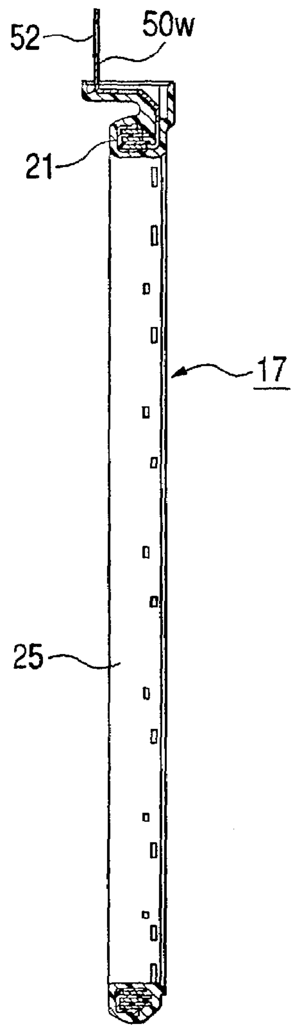
FIG. 6A is a cross sectional view of the centralized distribution unit.
Figure 6B:
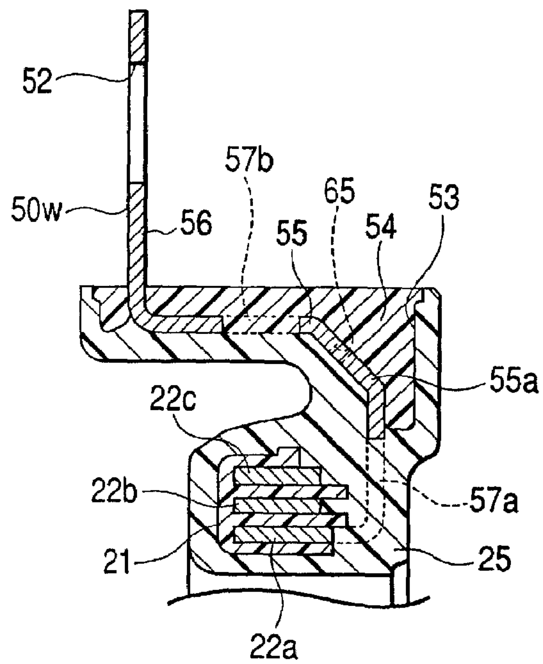
FIG. 6B is an enlarged cross sectional view of a terminal portion of the unit.
Figure 6C:
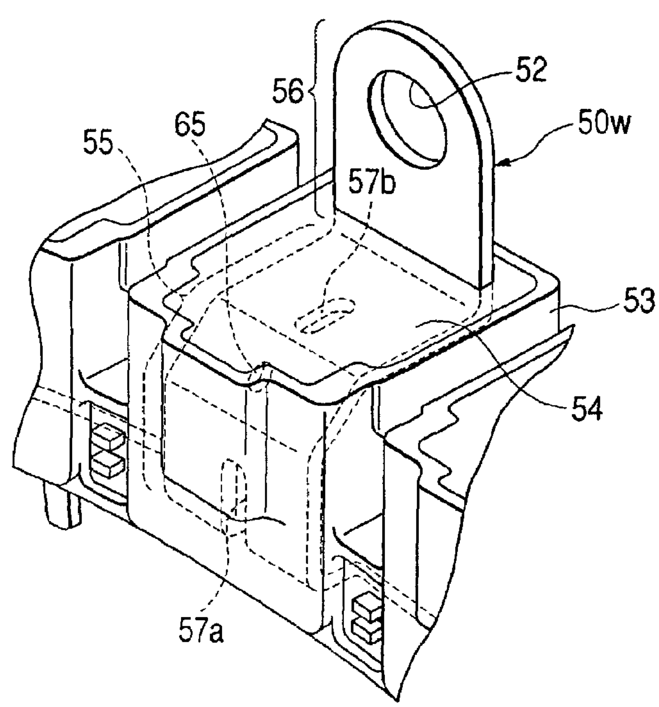
FIG. 6C is an enlarged perspective view of the terminal portion shown in FIG. 6B.
Figure 7:
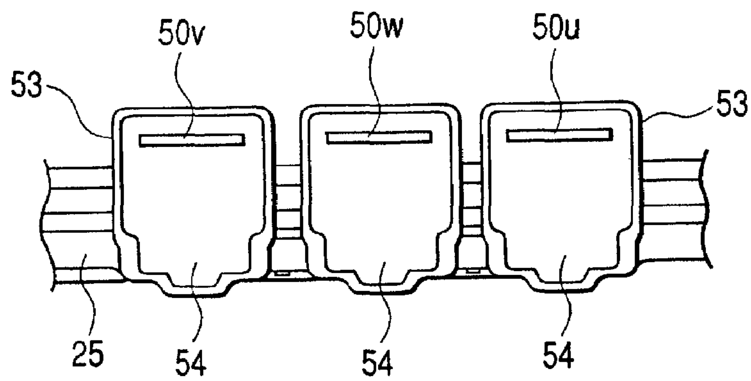
FIG. 7 is a plan elevation view of a terminal portion of the centralized distribution unit.

As shown in FIGS. 6 and 7, the respective terminal portions 50*u*, 50*v*, and 50*w* are provided on the distal ends with bolt through-holes that permit attachment bolts (not shown) for the electric power source cables 51 to pass. Resin-containing sections 53 are formed integrally together with the outer periphery of the resin insulation layer 25 to enclose the outer peripheries from the proximal ends to the central portions of the respective terminal portions 50*u*, 50*v*, and 50*w*. The resin-containing sections 53 are filled with sealing material 54 made of an insulative thermosetting resin. The sealing material 54 embeds portions disposed near the proximal ends away from the bolt through-holes 52 and exposed from the resin insulation layer 25 on the respective terminal portions 50*u*, 50*v*, and 50*w*. Waterproof-ness and airtight-ness functions are enhanced by the sealing material 54 embedding the parts of the respective terminal portions 50*u*, 50*v*, and 50*w*. In the present embodiment, the sealing material 54 is preferably a silicone-based thermosetting resin. Alternatively, the thermosetting resin may be any resin other than a silicone-based resin.

Figure 28:
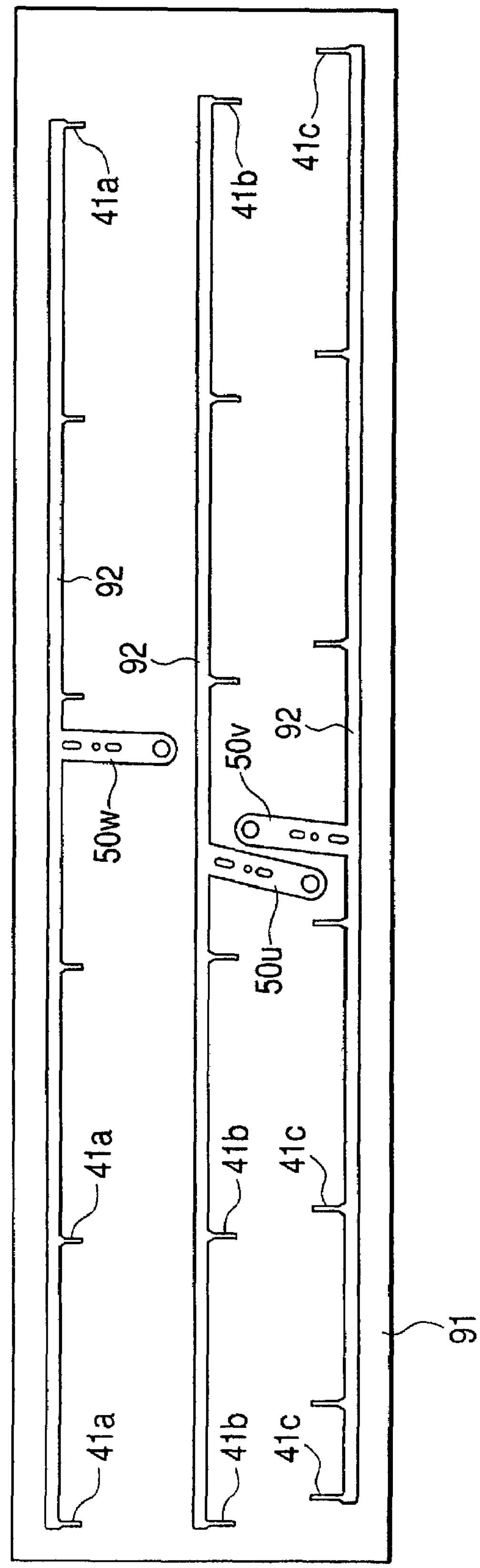
FIG. 28 is a plan view of a conductive metallic plate to be punched into the strip-like blanks, illustrating a process for producing the centralized distribution unit.

FIG. 28 is a developed view of the bus bars 22*a*, 22*b*, and 22*c*. As shown in FIG. 28, the respective terminal portions 50*u*, 50*v*, and 50*w* are disposed substantially on longitudinally central parts of the respective bus bars 22*a*, 22*b*, and 22*c*. The numbers of the respective tabs 41*a*, 41*b*, and 41*c* on opposite sides of the respective terminal portions 50*u*, 50*v*, and 50*w* are preferably the same. In more detail, three tabs 41*a*, 41*b*, and 41*c* are provided on one side of the respective terminal portions 50*u*, 50*v*, and 50*w* while three tabs 41*a*, 41*b*, and 41*c* are provided on the other side of the respective terminal portions 50*u*, 50*v*, and 50*w*. The reason why the same numbers of the tabs 41*a*, 41*b*, and 41*c* are provided on the opposite sides of the terminal portions 50*u*, 50*v*, and 50*w* is to permit equal amounts of current to flow in the tabs 41*a*, 41*b*, and 41*c*.

As shown in FIGS. 6 and 8, the respective terminal portions 50*u*, 50*v*, and 50*w* include embedded sections 55 covered by the sealing material 54 on their proximal ends, and exposed sections 56 having the bolt through-holes 52 and not covered by the sealing material 54 on their distal ends. The embedded sections 55 are pressed to form central ramp portions 55*a*. These central ramp portions 55*a* can save material in comparison with central right-angled portions, and reduce weights of the bus bars 22*a*, 22*b*, and 22*c*.

Slits 57*a* and 57*b* are provided on opposite sides of the embedded portions of the respective terminal portions 50*u*, 50*v*, and 50*w*. Both slits 57*a* and 57*b* extend in the longitudinal directions of the respective terminal portions 50*u*, 50*v*, and 50*w*. The two slits 57*a* and 57*b* reduce a part of the embedded section 55, thereby making a width of the reduced portion narrower than that of a non-reduced portion. Such structure can make a difference in reducing heat contraction between the resin insulation layer 25 and the bus bars 22*a* to 22*c* when the resin insulation layer encloses the insulating holder 25 during insert molding. The number and width of the slits 57*a* and 57*b* may be changed without lowering mechanical strengths of the respective terminal portions

50*u*, 50*v*, and 50*w*. For example, two slits 57*a* and 57*b* may be provided on the opposite sides of the embedded section 55, respectively.

As shown by cross hatching in FIG. 8, parts of the exposed section 56 and embedded section 55 on the respective terminal portions 50*u*, 50*v*, and 50*w* are covered by tinning. In more detail, tinning covers an area from the distal end of the exposed section 56 to the central ramp portion 55*a* of the embedded section 55. This tinning can prevent the bus bars 22*a*, 22*b*, and 22*c* from being subject to corrosion by oxidation.

After the respective terminal portions 50*u*, 50*v*, and 50*w* are bent by a first press apparatus 60 shown in FIGS. 18 and 19, a second press apparatus 61 shown in FIG. 20 further bends them.

The first press apparatus 60 will be explained below with reference to FIGS. 18 and 19. As shown in FIGS. 18 and 19, the first press apparatus 60 bends the respective terminal portions 50*u*, 50*v*, and 50*w*. The first press apparatus 60 includes a stationary lower die member 62 and a movable upper die member 63. When the upper die member 63 moves down toward the lower die member 62, both dies are closed. Conversely, when the upper die member 63 moves up away from the lower die member 62, both dies are opened.

The lower die member 62 is provided on the upper surface with a lower forming V-shaped recess 62*a* and a lower forming V-shaped protrusion 62*b* adjacent the recess 62*a*. A pilot pin 64 is formed at the top of the lower forming protrusion 62*b*. When the pilot pin 64 passes through a pilot hole 65 formed in the central ramp portion 55*a* of each of the terminal portions 50*u*, 50*v*, and 50*w*, the respective terminal portions 50*u*, 50*v*, and 50*w* are positioned.

On the other hand, the upper die member 63 is provided on the lower surface with an upper forming V-shaped protrusion 63*a* and an upper forming V-shaped recess 63*b* adjacent the protrusion 63*a*. The upper forming protrusion 63*a* is opposed to the lower forming recess 62*a* while the upper forming recess 63*b* is opposed to the lower forming protrusion 62*b*. When the upper die member 63 moves down toward the lower die member 62 to the closed position, the upper forming protrusion 63*a* engages the lower forming recess 62*a*. The upper forming recess 63*b* is provided on the bottom surface with an escape recess 66. When the lower and upper die members 62 and 63 are driven to the closed position, the pilot pin 64 enters the escape recess 66, thereby preventing the pilot pin 64 and upper die member 63 from interfering with each other.

Next, a second press apparatus 61 will be explained below by referring to FIG. 20. As shown in FIG. 20, the second press apparatus 61 bends boundary sections between the respective terminal portions 50*u*, 50*v*, and 50*w* and the respective bus bars 22*a,* 22*b*, and 22*c*. The second press apparatus 61 comprises a stationary lower die member 67 and a movable upper die member 68. When the upper die member 68 moves down toward the lower die member 67, both dies are closed. Conversely, when the upper die member 68 moves up away from the lower die member 67, both dies are opened.

The lower die member 67 is provided on the upper surface with a lower forming protrusion 67*a* that engages the embedded section 55 on the respective terminal portions 50*u*, 50*v*, and 50*w*. An insertion pin 69 is formed near the lower forming protrusion 67*a* on the lower die member 67 to position the terminal portions 50*u*, 50*v*, and 50*w*. When the respective terminal portions 50*u*, 50*v*, and 50*w* are set on the lower die member 67, the insertion pin 69 passes through the respective bolt through-hole 52. When the insertion pin 69 passes through the bolt through-hole 52, the respective terminal portions 50*u*, 50*v*, and 50*w* are prevented from being displaced.

The upper die member 68 is provided on the lower surface with an upper forming recess 68*a* opposing the lower forming protrusion 67*a*. When the upper and lower die members 68 and 67 are driven to the closed position, the upper forming recess 68*a* engages the lower forming protrusion 67*a*. The thickness of the portion of the upper die member 68 other than the portion at which the upper forming recess 68*a* is formed is designed so that the insertion pin 69 on the lower die member 67 does not interfere with the upper die member 68 when the upper and lower die members are driven to the closed position.

Figure 18B:
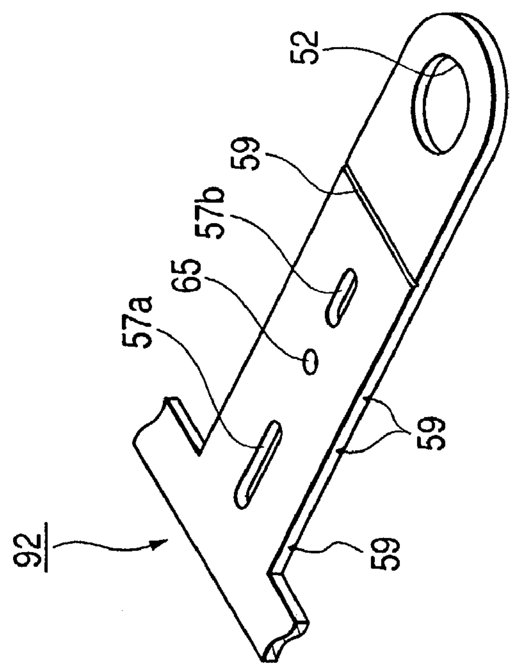
FIG. 18B is a perspective view of a part of a strip-like blank to be pressed by the first press apparatus shown in FIG. 18A.
Figure 18A:
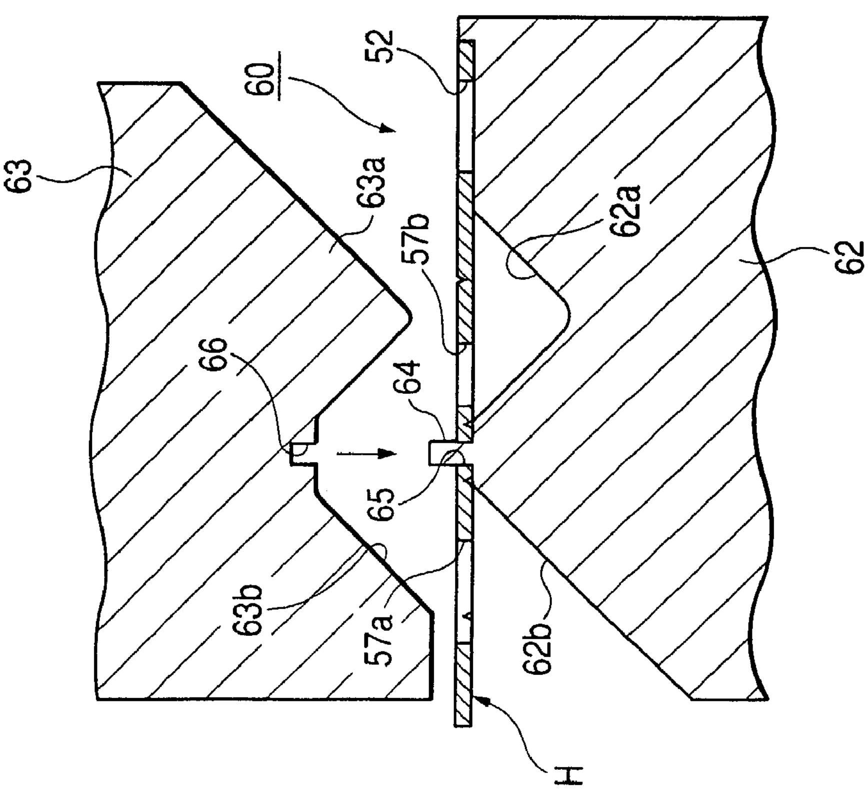
FIG. 18A is a cross sectional view of a first press apparatus, illustrating the apparatus in an open position.
Figure 21A:
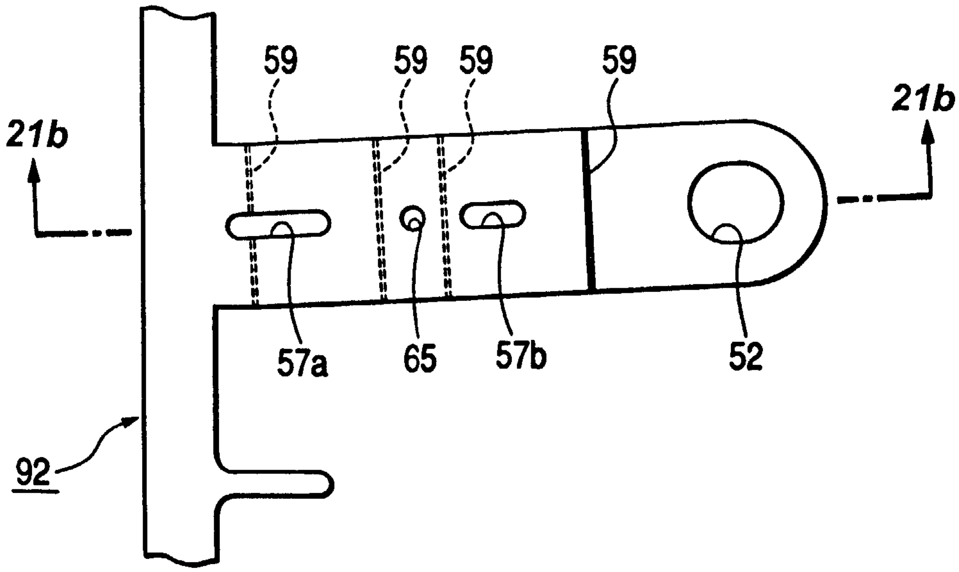
FIG. 21A is a plan elevation view of a strip-like blank, illustrating the blank in a state before a terminal portion of the bus bar is bent.
Figure 21B:
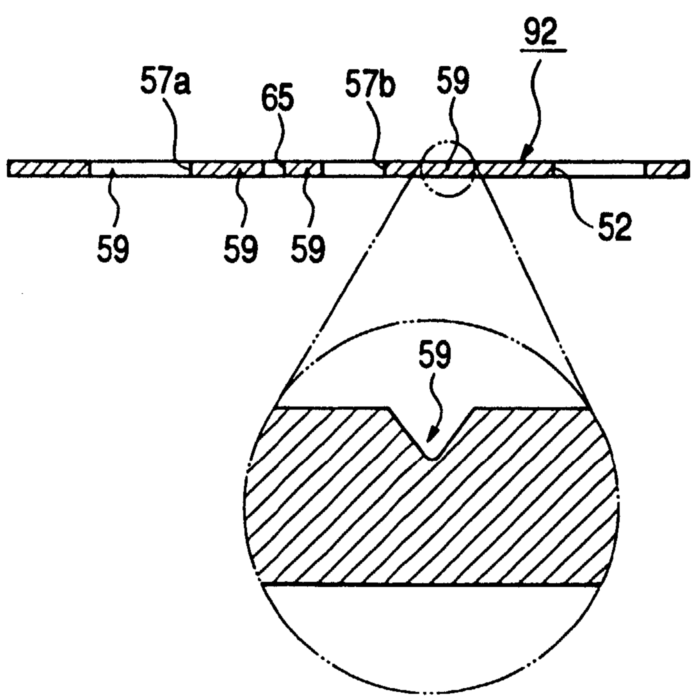
FIG. 21B is a longitudinal sectional view of the blank taken along line 21*b*—21*b* in FIG. 21B.

As shown in FIG. 18*a* and FIGS. 21A and 21B, a plurality of notches 59 extending in the lateral (width) direction are formed on the areas to be bent on the respective terminal portions 50*u*, 50*v*, and 50*w* by the first and second press apparatuses 60 and 61. Each notch 59 is formed in a surface of a strip-like blank 92 punched out from the conductive metallic plate before forming the respective terminal portions 50*u*, 50*v*, and 50*w*. In the present embodiment, one notch is formed in one surface of the strip-like blank 92 corresponding to the respective terminal portions 50*u*, 50*v*, and 50*w*, while three notches are formed in the other surface of the blank 92. The strip-like blank 92 is bent inwardly at the notch 59.

Next, a process for bending the respective terminal portions 50*u*, 50*v*, and 50*w* by using the first and second press apparatuses 60 and 61 mentioned above will be explained.

As shown in FIGS. 18A and 18B, when the upper and lower die members 63 and 62 of the first press apparatus 60 are driven to the opened position, the strip-like blanks 92 punched out from the conductive metallic plate are put on the lower die member 62. The pilot pin 64 on the lower die member 62 passes through the pilot hole 65 formed in a respective strip-like blank 92 to prevent or reduce displacement of the blank 92.

Figure 19B:
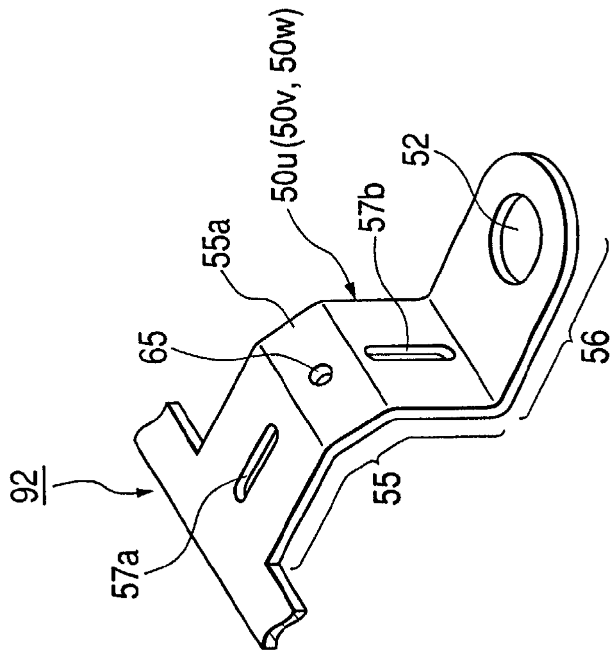
FIG. 19B is a perspective view of a strip-like blank that has been pressed in the first press apparatus shown in FIG. 19A.
Figure 19A:
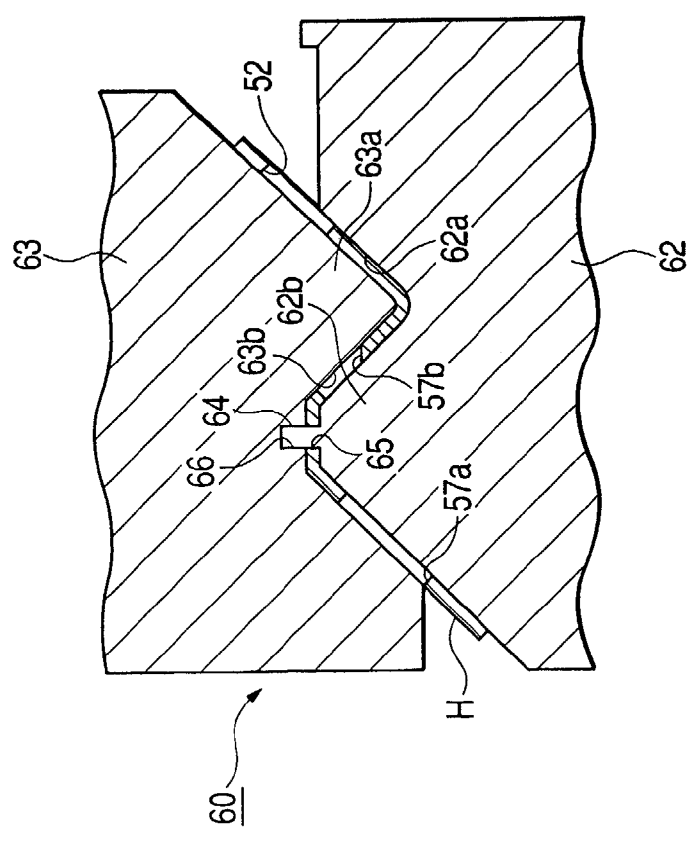
FIG. 19A is a cross sectional view of the first press apparatus, illustrating the apparatus in a closed position.

As shown in FIGS. 19A and 19B, when the upper and lower die members 63 and 62 are driven to the closed position, the strip-like blank 92 is clamped between the lower forming recess 62*a* and the upper forming protrusion 63*a* and between the lower forming recess 62*b* and the upper forming protrusion 63*b*. Thus, the respective strip-like blanks 92 are bent at the portions corresponding to the respective terminal portions 50*u*, 50*v*, and 50*w* to form the respective terminal portions 50*u*, 50*v*, and 50*w*. Thereafter, the upper and lower die members 63 and 62 are driven to the opened position and the strip-like blank 92, in which the respective terminal portion 50*u*, 50*v*, or 50*w* is formed, is removed from the lower die member 62.

Figures 20A, 20B:
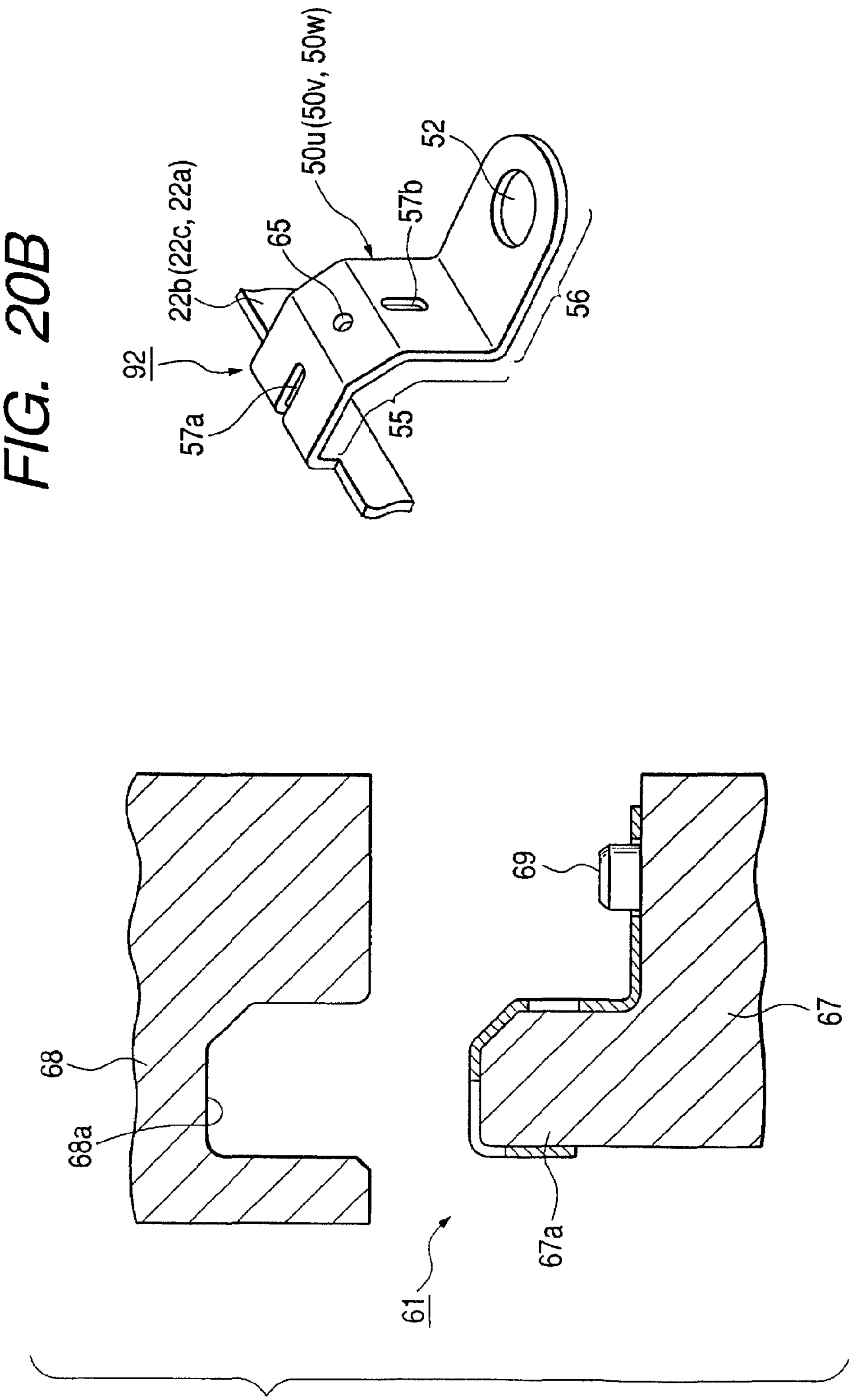
FIG. 20A is a cross sectional view of a second press apparatus, illustrating the apparatus in an open position.
FIG. 20B is a perspective view of a strip-like blank that has been pressed in the second press apparatus shown in FIG. 20A.

As shown in FIGS. 20A and 20B, when the upper and lower die members 68 and 67 of the second press apparatus 61 are driven to the opened position, the respective terminal portion 50*u*, 50*v*, or 50*w* formed by the first press apparatus 60 engages the lower die member 62. The insertion pin 69 passes through the bolt through-hole 52 formed in the respective terminal portions 50*u*, 50*v*, or 50*w* to prevent or reduce displacement of the blank 92.

When the upper and lower die members 68 and 67 are driven to the closed position, an end of the strip-like blank 92, namely a portion corresponding to the respective bus bars 22*a*, 22*b*, or 22*c*, is clamped between the lower forming protrusion 67*a* and the upper forming recess 68*a* to bend at a right angle the boundary areas between the respective bus bar 22*a*, 22*b*, or 22*c* and the respective terminal portion 50*u*, 50*v*, or 50*w*. Thereafter, the upper and lower die members 68 and 67 are driven to the opened position and the strip-like blank 92, in which the respective terminal portion 50*u*, 50*v*, or 50*w* is formed, is removed from the lower die member 67.

As shown in FIGS. 24 to 27, the resin insulation layer 25 for covering the insulating holder 21 is formed by an insert-molding mold 70. The insert-molding mold 70 comprises a stationary lower mold member 71 and a movable upper mold member 72. The upper mold member 72 can move to and from the lower mold member 71. When the upper mold member 72 moves down to the lower mold member 71, the mold 70 is placed in a closed position. When the upper mold member 72 moves up from the lower mold member 71, the mold 70 is placed in an open position.

A forming recess 71*a* in the lower mold member 71 is opposed to a forming recess 72*a* in the upper mold member 72. When the lower and upper mold members 72 and 71 are driven to the closed position, the forming recesses 72*a* and 71*a* define an annular cavity 73. A molten resin material 90 is poured through a gate (not shown) into the cavity 73 to form the resin insulation layer 25.

The upper mold member 72 is provided with upper mold member supports 80 that push an upper surface of the insulating holder 21 to be contained in the cavity 73. The upper mold member supports 80 can move out from and into an inner top surface of the upper forming recess 72*a*. Although not shown in the drawings, a plurality of upper mold member supports 80 (eighteen in the present embodiment) are provided in the upper mold member 72. The upper mold member supports 80 are arranged at an even spacing on the circumference of the insulating holder 21, except for the portions where the terminal portions 50*u*, 50*v*, and 50*w* are located. When the upper mold member supports 80 are advanced out from the upper forming recess 72*a*, a plurality of latch grooves 81 formed in the ends of the supports 80 engage the wall 43*b* that spaces the inside bus bar 22*a* from the intermediate bus bar 22*b*, and also engage the wall 43*c* that spaces the intermediate bus bar 22*b* from the outside bus bar 22*c*. Under this engagement condition, distal end surfaces of the upper mold member supports 80 come into contact with upper end edges of the respective bus bars 22*a,* 22*b*, and 22*c*. Consequently, the upper mold member supports 80 push the insulating holder 21 (an upper portion of the holder 21 in FIG. 24).

The lower mold member 71 is provided with holder support pins 74 that support the insulating holder 21 to be contained in the cavity 73. The holder support pins 74 can move out from a bottom surface of the lower forming recess 71*a* into the cavity 73 and move from the cavity 73 into the bottom surface. Although not shown in the drawings, a plurality of holder support pins 74 (thirty-six pins in the present embodiment) are provided in the lower mold member 71. The holder support pins 74 are arranged at an even spacing on the circumference of the insulating holder 21. Each holder support pin is preferably formed into a stick-like configuration having a tapered end. Preferably, the tapered end of each holder support pin 74 has a taper angle of about 30 to 150 degrees.

Figure 22:
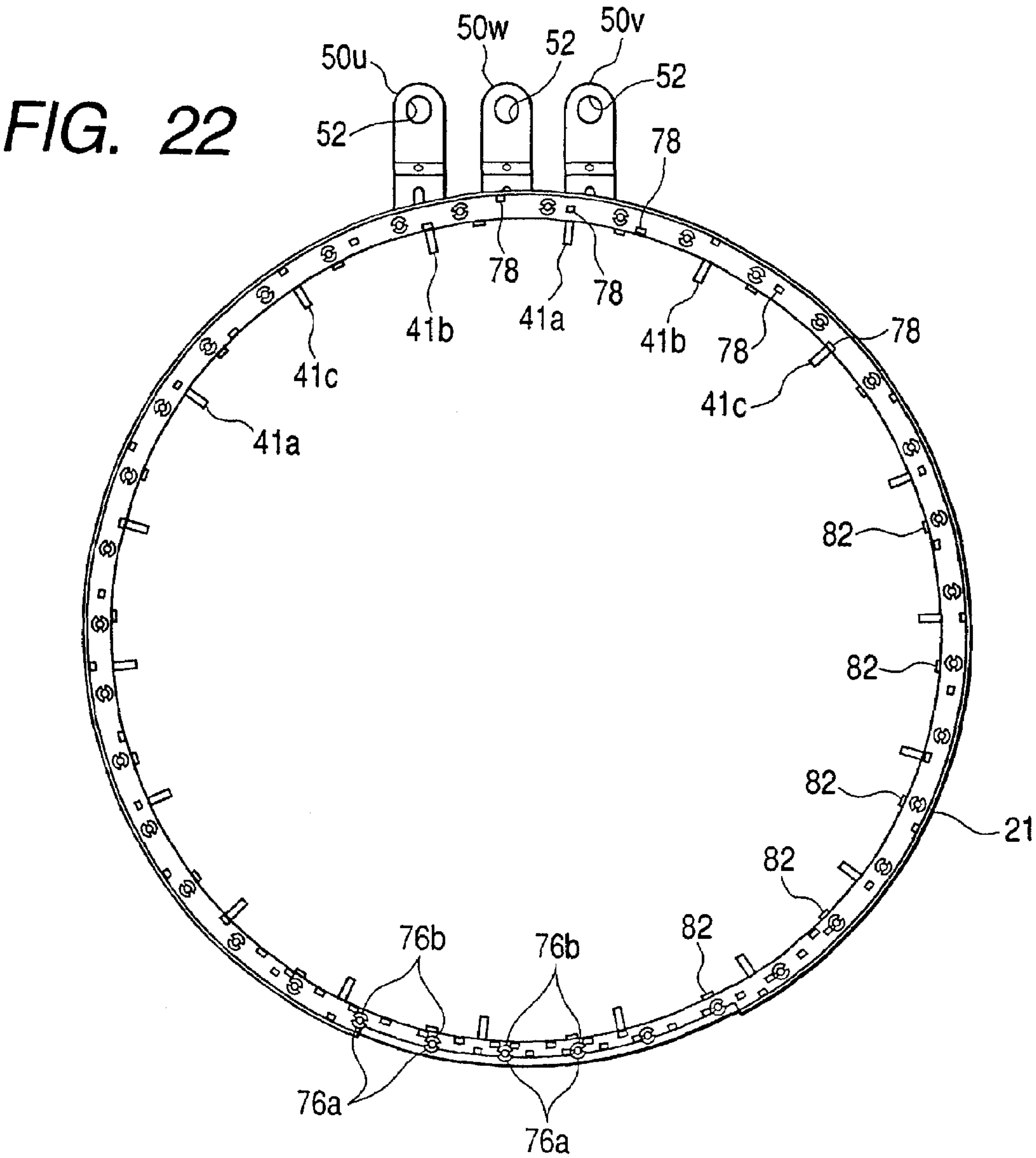
FIG. 22 is a rear elevation view of the insulating holder.
Figure 23A:
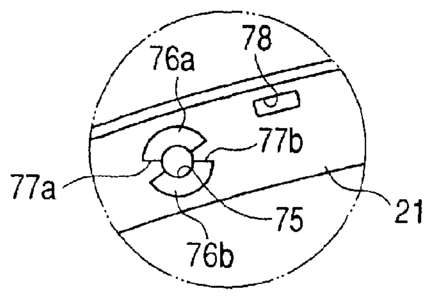
FIG. 23A is an enlarged plan elevation view of a bearing recess.
Figure 23B:
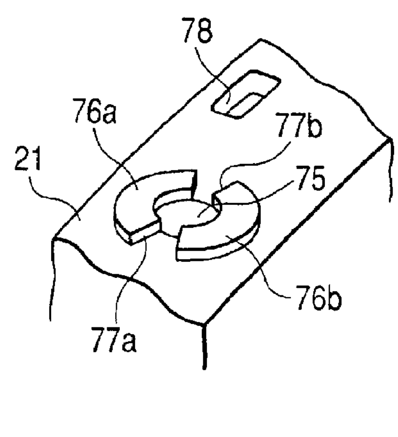
FIG. 23B is an enlarged perspective view of the bearing recess shown in FIG. 23A.

As shown in FIG. 22, and FIGS. 23A and 23B, when the holder support pins 74 move out from the bottom surface of the lower forming recess 71*a* into the cavity 73, the distal ends of the pins 74 engage bearing recesses 75 in the lower surface of the insulating holder 21. This engagement can prevent displacement of the insulating holder 21 in the radial direction of the cavity 73 when the insulating holder 21 is contained in the cavity 73. The insulating holder 21 is fixed at a proper position in the cavity 73 by the holder support pins 74 and upper mold member supports 80. Consequently, the resin insulation layer 25 is formed around the insulating holder 21 at a uniform thickness.

Each bearing recess 75 has a taper that reduces the recess in diameter toward the inner top part. Thus, the holder support pin 74 finally engages the bearing recess 75 while the pin 74 is being guided along the inner periphery of the bearing recess 75. Accordingly, when the insulating holder 21 is set in the lower forming recess 71*a* in the lower mold member 71, the holder support pin 74 does not fail to engage the bearing recess 75.

Two arcuate ribs 76*a* and 76*b* are formed around the holder support pin 74 on the bottom surface of the insulating holder 21. The ribs 76*a* and 76*b* make a virtual depth of the bearing recess 75 larger. This reduces the chance of the holder support pin 74 disengaging from the bearing recess 75 inadvertently and reduces the chance of the insulating holder 21 displacing in the cavity 73.

A plurality of notches 77*a* and 77*b* (two notches in the present embodiment) are provided between the ribs 76*a* and 76*b*. In the present embodiment, the ribs are formed integrally together simultaneously with a process of injection-molding the insulating holder 21. These notches 77*a* and 77*b* are arranged at opposed positions in the radial direction of the insulating holder 21 so that the notches 77*a* and 77*b* are opposed to the ribs 76*a* and 76*b,* respectively. Each of the pair of notches 77*a* and 77*b* become narrower gradually from the outer periphery to the inner periphery so that the molten resin material 90 can smoothly flow into the bearing recesses 75.

The notches 77*a* and 77*b* facilitate to flow the molten resin material 90 into the bearing recesses 75 after the holder support pins 74 are drawn out of the bearing recesses 75 during insert molding. In the final centralized distribution unit 17, the bearing recesses 75 are completely filled with the resin insulation layer 25.

As shown in FIGS. 22, 23, and in FIGS. 14 to 16, the insulating holder 21 is provided, in its bottom surface, with a plurality of communication holes 78 communicating with the holding grooves 23*a*, 23*b*, and 23*c*. The communication holes 78 facilitate the flow of resin for forming the resin insulation layer 25 into the respective holding grooves 23*a*, 23*b,* and 23*c* during insert molding. The plural communication holes 78 are provided on the periphery of the insulating holder 25. In more detail, the respective communication holes 78 are arranged along the holding grooves 23*a*, 23*b*, and 23*c*. In addition, as shown in FIG. 10, the respective communication holes 78 are shifted from each other in the circumferential direction of the insulating holder 21. This means that only one communication hole 78 is disposed on the same line in the radial direction of the insulating holder 21.

Figure 24:
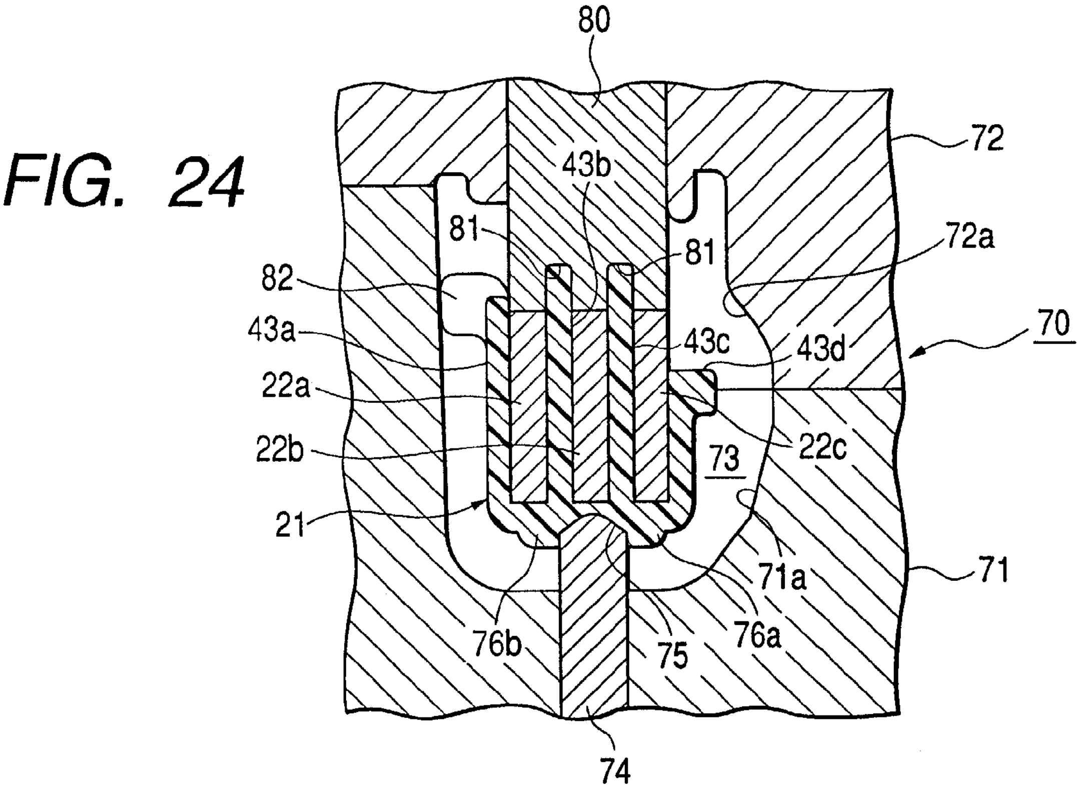
FIG. 24 is a cross sectional view of an insert-molding mold, illustrating the mold in which the insulating holder is set.

As shown in FIGS. 22 and 24, the insulating holder 21 is provided on the inner surface with positioning projections 82 the distal ends of which come into contact with the inner surface of the lower forming recess 71*a* when the insulating holder 21 is set in the lower mold member 71. The plural positioning projections 82 are arranged at an even spacing in the circumferential direction of the insulating holder 21. When all of the positioning projections 82 come into contact with the inner surface of the lower forming recess 71*a*, displacement of the insulating holder 21 in its circumferential direction can be substantially eliminated.

Figure 12:
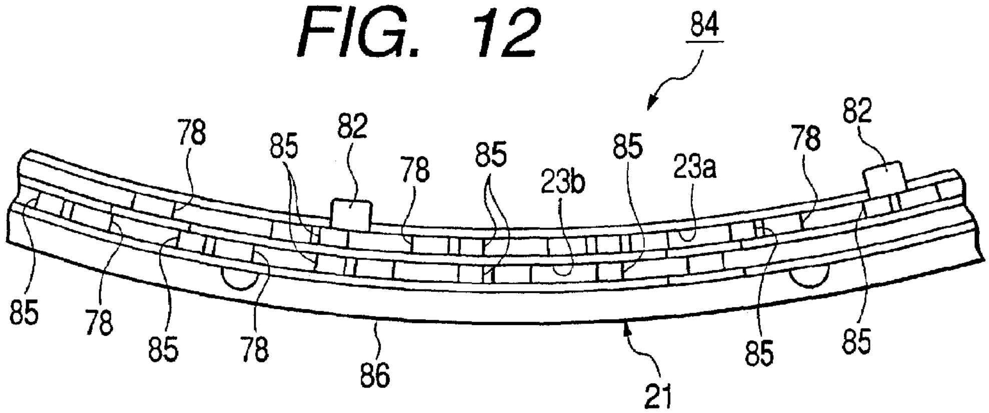
FIG. 12 is an enlarged front elevation view of a part of the insulating holder, illustrating a bus bar non-containing section in the holder.
Figure 13A:
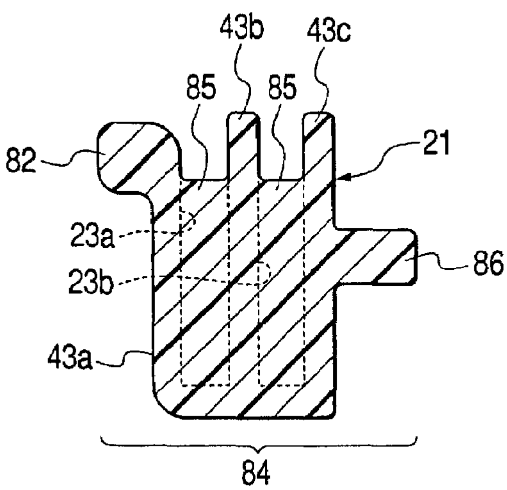
FIG. 13A is a cross sectional view of the insulating holder taken along line 13*a*—13*a* in FIG. 9.
Figure 13B:
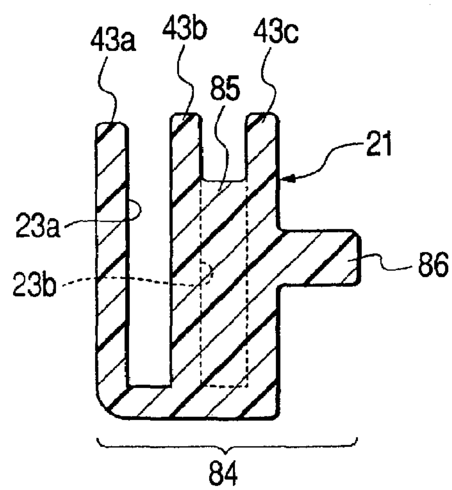
FIG. 13B is a cross sectional view of the insulating holder taken along line 13*b*—13*b* in FIG. 9.
Figure 13C:
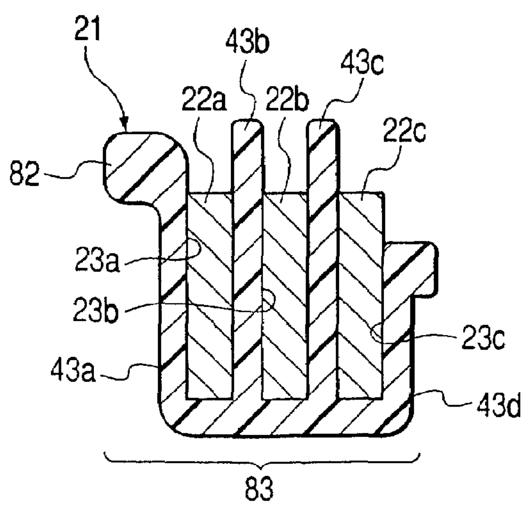
FIG. 13C is a cross sectional view of the insulating holder taken along line 13*c*—13*c* in FIG. 9.

As shown in FIGS. 9, 12, and 13, the respective holding grooves 23*a* to 23*c* in the insulating holder 21 are divided into a bus bar containing section 83 that accommodates the bus bars 22*a* to 22*c* and a bus bar non-containing section 84 that does not accommodate the bus bars. First reinforcement ribs 85 are provided at a given distance in the circumferential direction of the insulating holder 21 on the holding grooves 23*a*, 23*b*, and 23*c* in the bus bar non-containing section 84. The respective first reinforcement ribs 85 are formed integrally together with bottom surfaces and inner side surfaces of the walls 43*a* to 43*d* partitioning the respective holding grooves 23*a*, 23*b*, and 23*c*.

The communication holes 78 that serve to facilitate to flow the molten resin material 90 into the respective holding grooves 23*a*, 23*b*, and 23*c* are formed in the bottom surface of the respective holding grooves 23*a*, 23*b*, and 23*c* in the respective sections 83 and 84. Thus, the molten resin material 90 easily flows into the respective holding grooves 23*a*, 23*b*, and 23*c*.

Three holding grooves 23*a*, 23*b*, and 23*c* are provided in the bus bar containing section 83 in the insulating holder 21 while two holding grooves 23*a* and 23*b* are provided in the bus bar non-containing section 84 in the insulating holder 21. That is, there is no holding groove 23*c* at the outermost side in the bus bar non-containing section 84. The bus bar non-containing section 84 in the insulating holder 21 is narrower than the bus bar containing section 83.

Furthermore, the bus bar non-containing section 84 in the insulating holder 21 is provided on the outer periphery with second reinforcement ribs 86 extending in the circumferential direction of the insulating holder 21. The second reinforcement ribs 86 are formed into arcuate shapes and a radius of curvature of each rib 86 is set to be the same as the radius of the insulating holder 21.

Next, a process for insert-molding the centralized distribution unit 17 by using the insert-molding mold 70 described above will be explained below.

When the mold 70 is driven to the opened position, the insulating holder 21 is put in the lower forming recess 71*a* in the lower mold member 71. The holder support pins 74 projecting from the lower forming recess 71*a* engage the bearing recesses 75 in the insulating holder 21 at the distal ends. Thus, the insulating holder 21 is supported in the lower mold member 71 with the holder 21 being spaced at a certain distance from the bottom surface of the lower forming recess 71*a*. At this time, the respective plural positioning projections 82 on the insulating holder 21 come into contact with the inner periphery of the lower forming recess 71*a* at the distal end surfaces. This substantially prevents displacement of the insulating holder 21 in the radial direction.

As shown in FIG. 24, when the upper mold member 72 moves down toward the lower mold member 71 to close the mold 70, the cavity 73 is defined in the mold 70. When the mold 70 is closed, the distal end surfaces of the upper mold member supports 80 projecting from the upper forming recess 72*a* come into contact with the upper ends of the bus bars 22*a*, 22*b*, and 22*c*. Further, the latch grooves 81 in the distal end surfaces of the upper mold member supports 80 engage the walls 43*b* and 43*c* that partition the respective holding grooves 23*a*, 23*b*, and 23*c*. Consequently, the upper mold member supports 80 push the insulating holder 21 and the bus bars 22*a*, 22*b*, and 22*c*. As described above, the insulating holder 21 is constrained from upward and downward movement by the plural holder support pins 74 and plural upper mold member supports 80.

Figure 25:
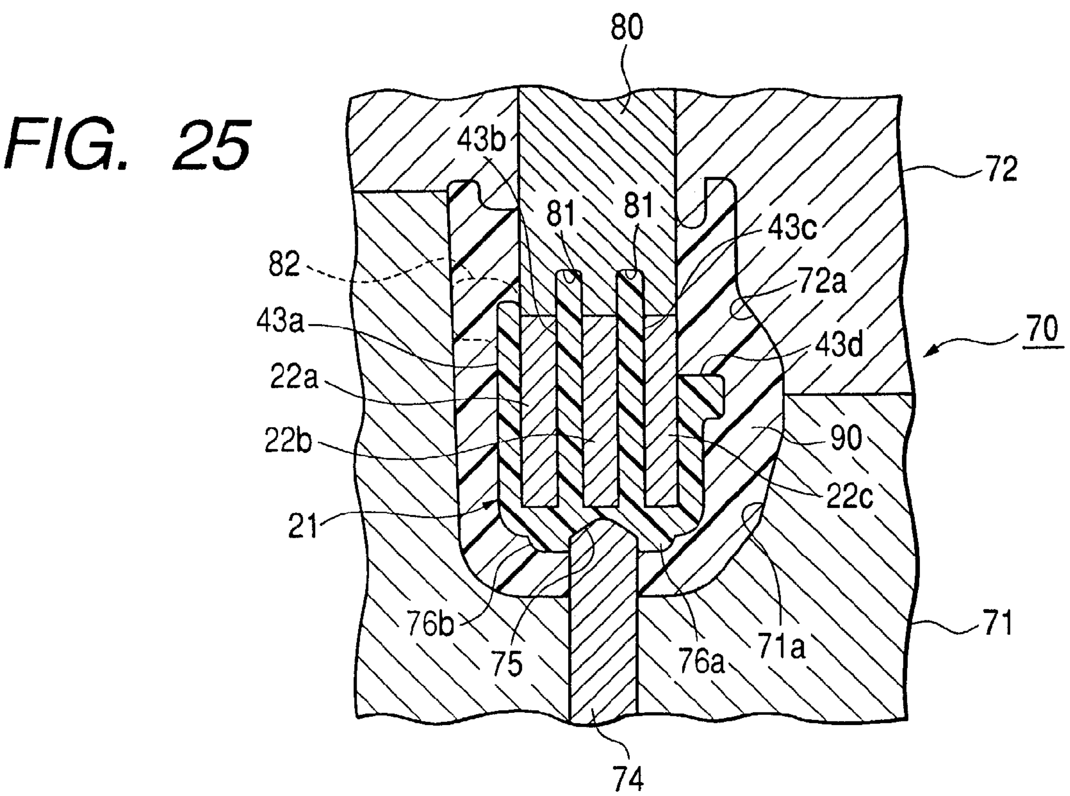
FIG. 25 is a cross sectional view of the insert-molding mold similar to FIG. 24, illustrating the mold into which a molten resin material is poured.

As shown in FIG. 25, molten resin material 90 for forming the resin insulation layer 25 is poured through a gate (not shown) formed in one of the mold members, e.g., the lower mold member 71, into the cavity 73. At this time, the molten resin material 90 that is poured to cover the insulating holder 21 flows through openings of the respective holding grooves 23*a*, 23*b*, and 23*c* into their interiors. In addition, the molten resin material 90 flows through the communication holes 78 in the insulating holder 21 into the holding grooves 23*a*, 23*b*, and 23*c*. Even if the molten resin material 90 is applied under pressure to the holding grooves 23*a*, 23*b*, and 23*c* in the bus bar non-containing section 84 (see FIG. 12) in the insulating holder 21, the first and second reinforcement ribs 85 and 86 prevent or reduce deformation of the walls 43*a* to 43*c*.

Figure 26:
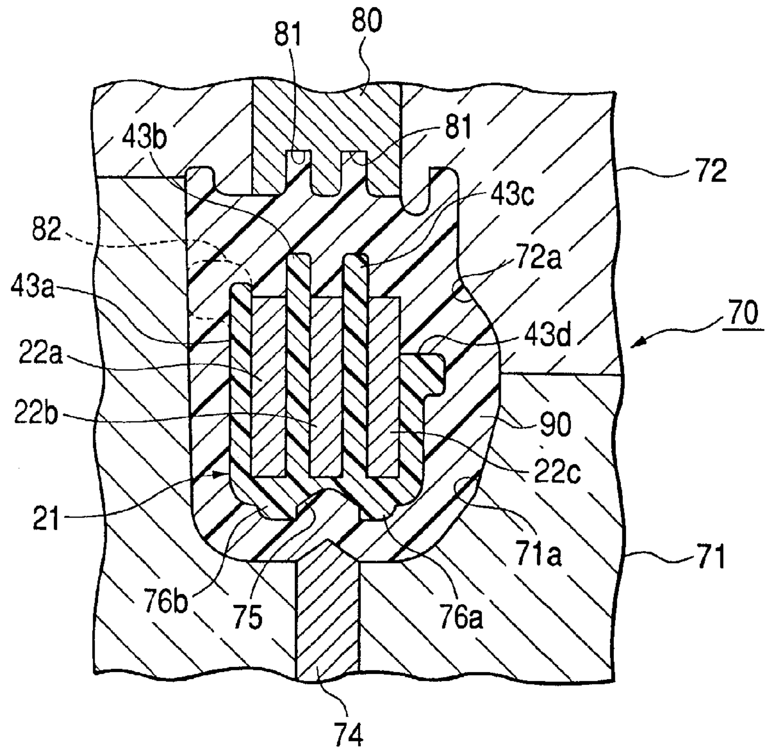
FIG. 26 is a cross sectional view of the insert-molding mold similar to FIG. 25, illustrating the mold in which a holder support pin and an upper mold member support are retracted.

When the molten resin material 90 substantially fills the cavity 73, as shown in FIG. 26, the holder support pins 74 retract into the lower mold member 71 and the upper mold member supports 80 retract into the upper mold member 72. Although the insulating holder 21 is fully floated in the cavity 73 without any supports, the insulating holder 21 will not incline in the cavity 73 since the molten resin material 90 is being poured into the cavity 73. In addition, the molten resin material 90 will fill the holes caused by the retraction of the holder support pins 74 and upper mold member supports 80. Furthermore, the molten resin material 90 flows into the bearing recesses 75 in which the holder support pins have engaged, the spaces around the bearing recesses 75, and the spaces between and around the upper ends of the walls 43*b* and 43*c*. Thus, the molten resin material 90 covers the insulating holder 21.

Figure 27:
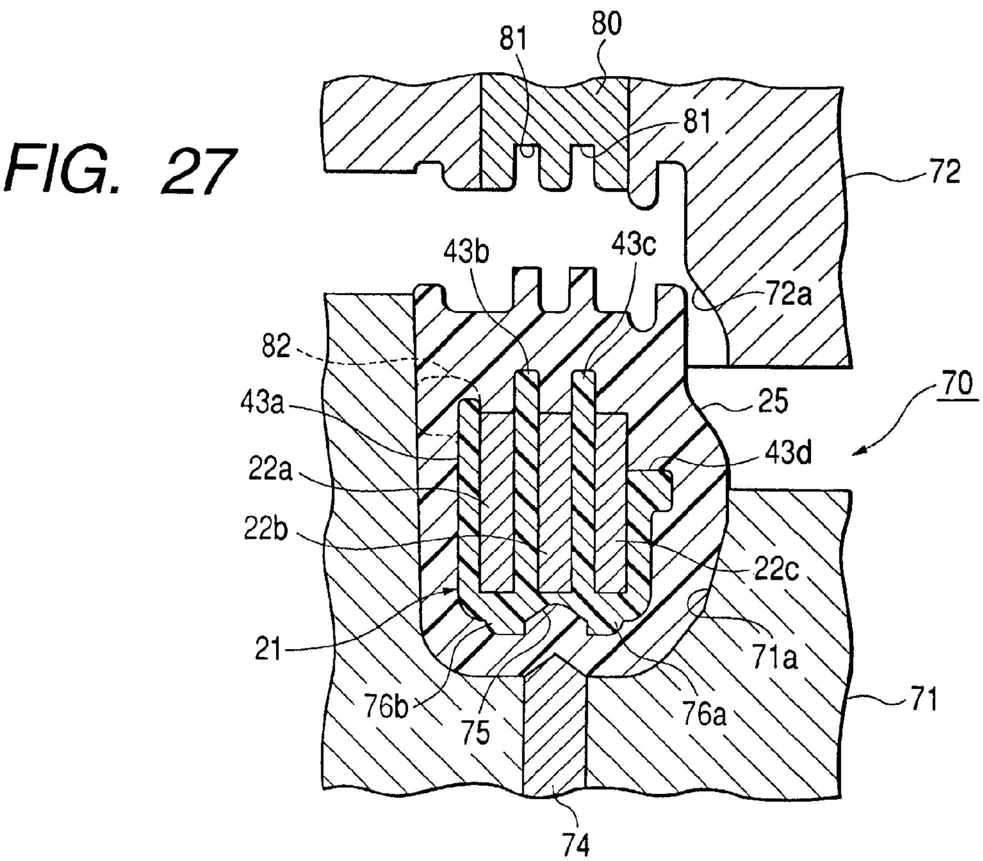
FIG. 27 is a cross sectional view of the insert-molding mold similar to FIG. 26, illustrating the mold in an open position.

As shown in FIG. 27, after a given period of time has passed and the molten resin material 90 has cooled and solidified, the insulation layer 25 is formed. Thereafter, the upper mold member 72 and the lower mold member 71 are separated and placed in the opened position, and the centralized distribution unit 17, in which the insulating holder 21 and the resin insulation layer 25 are integrated together, is removed from the mold 70.

An exemplary process for producing the centralized distribution unit 17 is explained below.

(Step of punching a conductive metallic plate)

Figure 29:
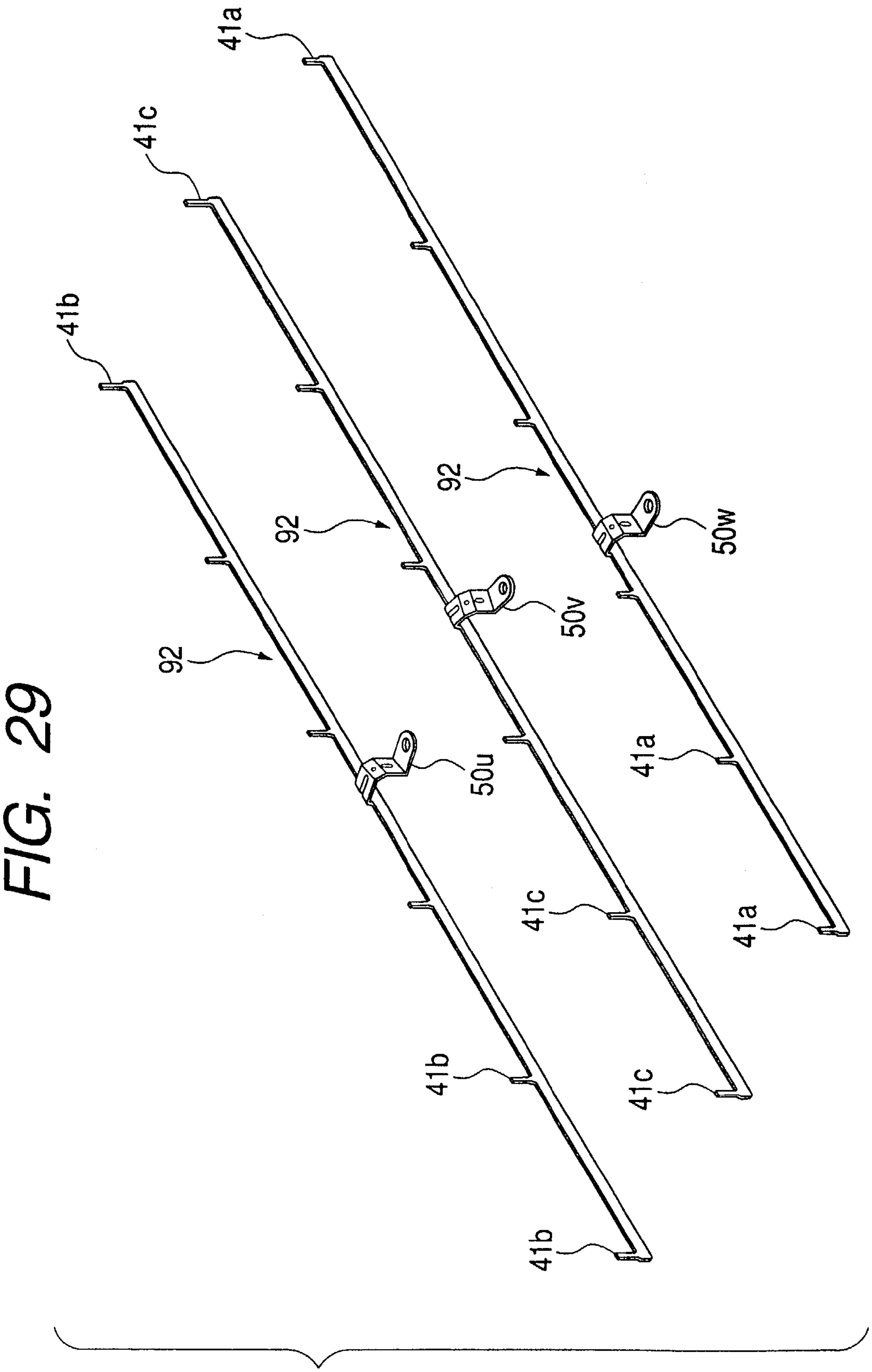
FIG. 29 is a perspective view of the blanks shown in FIG. 28, illustrating the terminal portion of each of bus bars being bent.

As shown in FIG. 29, a conductive metallic plate 91 is punched out and bent to form the respective bus bars 22*a* to 22*c* and a strip-like blank 92 by a press apparatus (not shown). Since the strip-like blanks 92 of the respective bus bars 22*a*, 22*b*, and 22*c* have linear shapes, it is possible to punch them in parallel. This improves yield significantly in comparison with punching the strip-like blanks 92 into annular shapes.

(First bending of the bus bars)

As shown in FIG. 29, the first and second press apparatuses 60 and 61 mentioned above bend the portions corresponding to the terminal portions 50*u*, 50*v*, and 50*w* in the strip-like blanks 92.

(Second bending of the bus bars)

As shown in FIG. 29, the portions corresponding to the bus bars 22*a*, 22*b*, and 22*c* in the strip-like blanks 92 in which the terminal portions 50*u*, 50*v*, and 50*w* have been formed are bent in the thickness direction to form annular shapes. This bending work is carried out by a bending device (not shown). Thus, the bus bars 22*a*, 22*b*, and 22*c* are formed into substantially annular shapes beforehand, before attaching the bus bars 22*a*, 22*b*, and 22*c* to the insulating holder 21.

(Step of inserting the bus bars)

Figure 30:
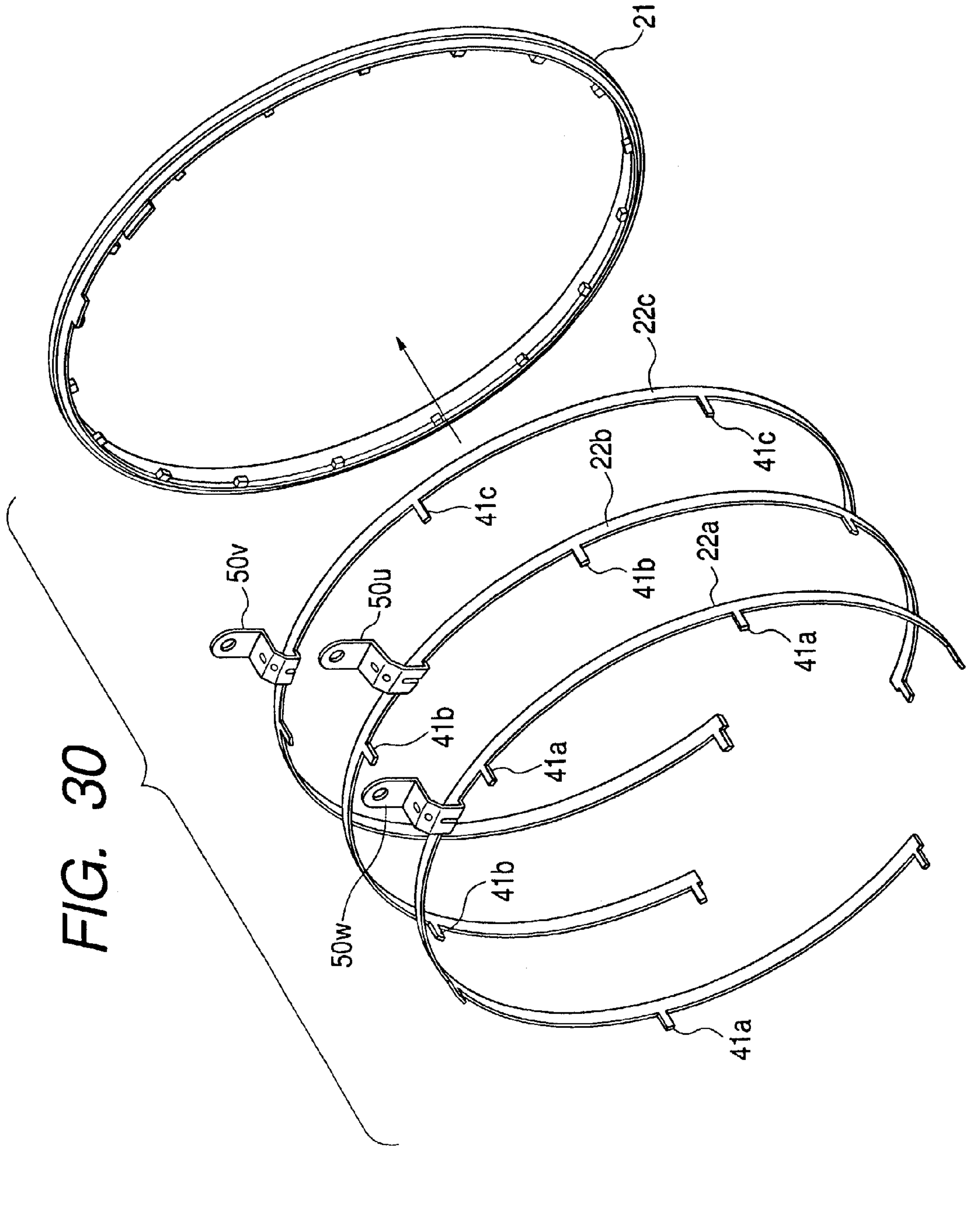
FIG. 30 is a perspective view of ring-like blanks that are formed by bending the blanks shown in FIG. 29, illustrating the bus bars being inserted into the insulating holder.

As shown in FIG. 30, the respective bus bars 22*a*, 22*b*, and 22*c* are inserted into the insulating holder 21 that has already been produced. At this time, the bus bars are inserted into the insulating holder 21 in order from the outermost position to the innermost position. That is, the outside bus bar 22*a*, intermediate bus bar 22*b*, and inside bus bar 22*c* inserted into the insulating holder 21 in that order. If the inside bus bar 22*c* is inserted into the insulating holder 21 before inserting the intermediate bus bar 22*b*, the prior bus bar interferes with entrance of the latter bus bar.

(Third bending of the bus bars)

Figure 31:
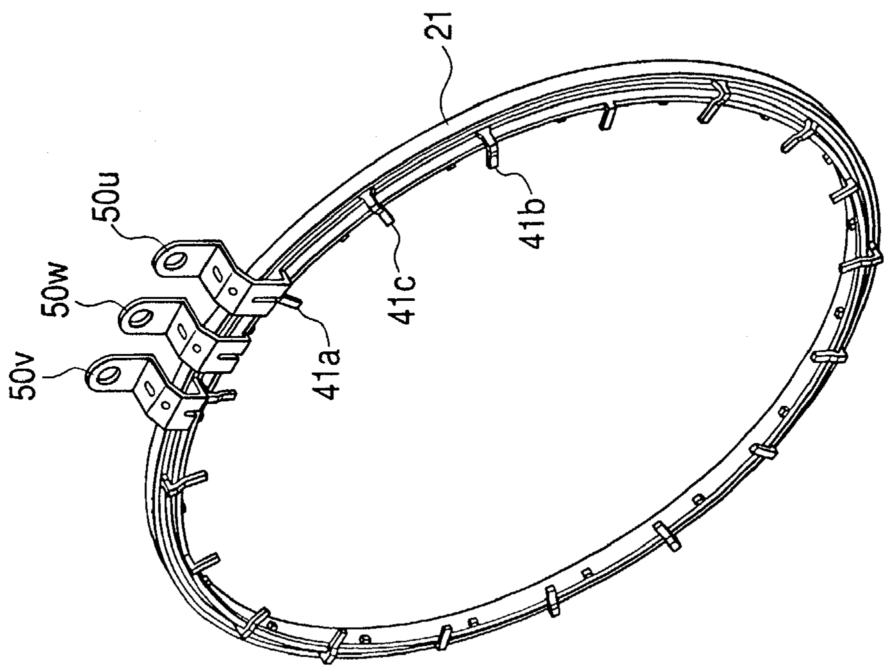
FIG. 31 is a perspective view of the blanks shown in FIG. 30, illustrating tabs of the bus bars being bent inward.
Figure 33A:
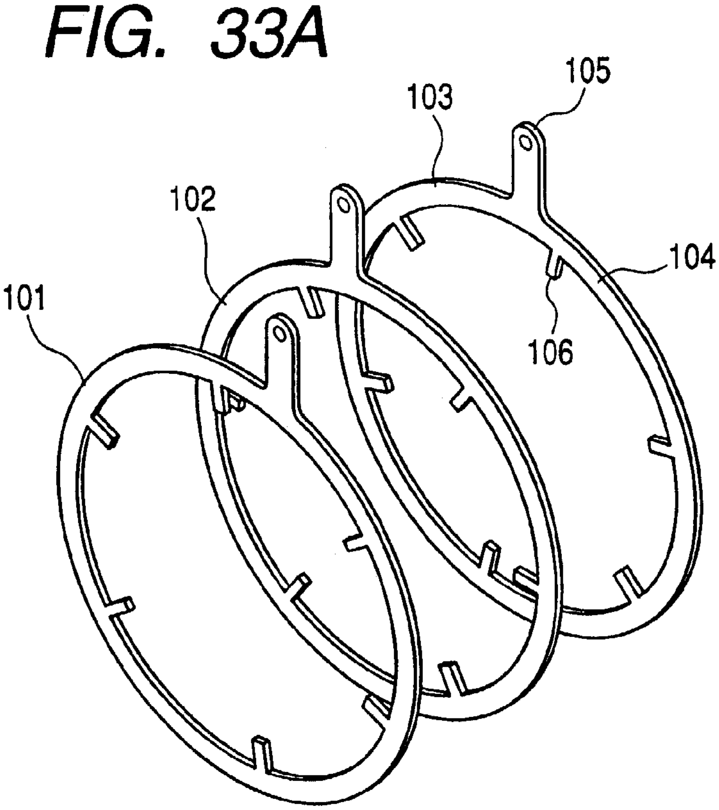
FIG. 33A is perspective view of conventional ring-like bus bars.
Figure 33B:
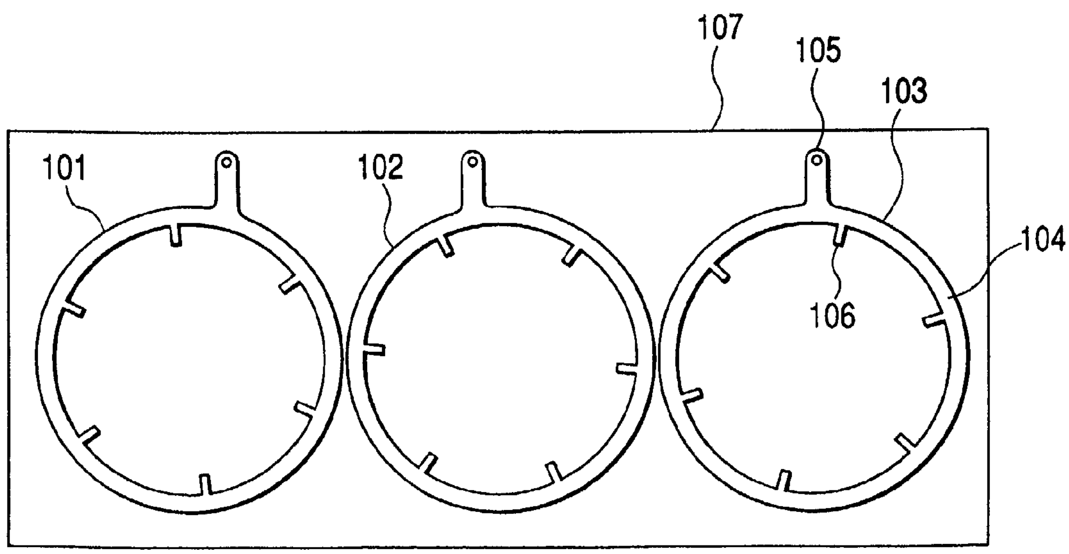
FIG. 33B is a plan view of a conductive metallic plate from which the conventional ring-like bus bars are to be punched out.

As shown in FIG. 31, the respective tabs 41*a*, 41*b*, and 41*c* are bent so that their distal ends are directed to the center of the insulating holder 21 with the respective bus bars 22*a* to 22*c* being attached to the insulating holder 21. The curved portions 44 and 45 are formed on the proximal ends of tabs of the the intermediate bus bar 22*b* and outside bus bar 22*c*, respectively.

(Insert molding)

Figure 32:
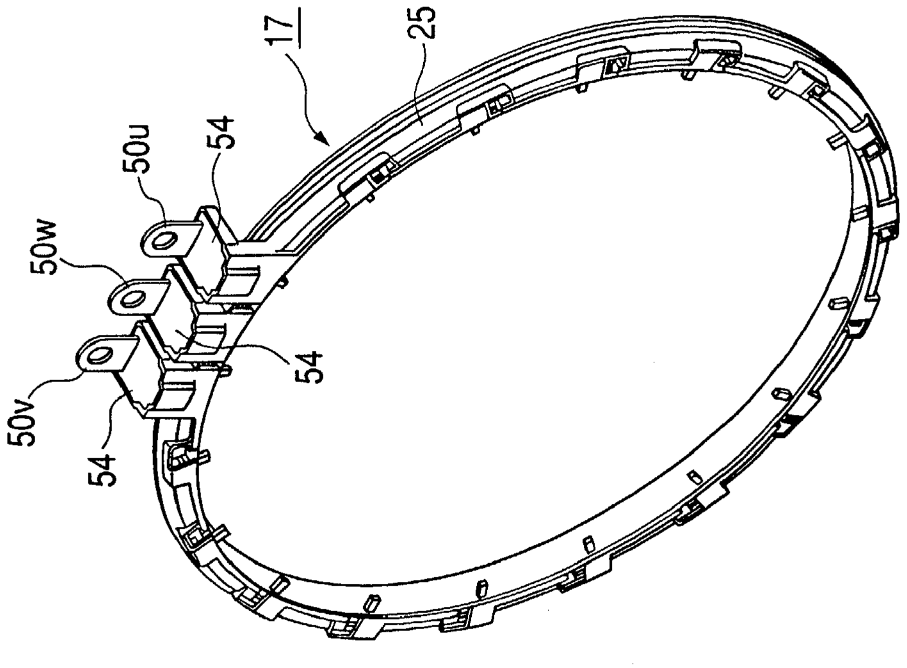
FIG. 32 is a perspective view of the blanks shown in FIG. 31, illustrating a part of the terminal portions being sealed by a sealing material.

As shown in FIG. 32, the resin insulation layer 25 is formed on the outer periphery of the insulating holder 21 to which the bus bars 22*a*, 22*b*, and 22*c* have been already attached. This forming process may be carried out by using the insert-molding mold 70 mentioned above. Thereafter, the centralized distribution unit 17 is taken out from the insert-molding mold 70. Finally, the sealing material 54 fills the resin containing sections 53 (FIG. 5) formed in the resin insulation layer 25.

Accordingly, effects including the following effects may be obtained according to the above-described embodiment.

(1) The bearing recesses 75 are provided in the bottom surface of the insulating holder 21 beforehand in the present embodiment. When the insulating holder 21 and respective bus bars 22*a*, 22*b*, and 22*c* are disposed in the cavity 73 in the insert-molding mold 70, the distal ends of the holder support pins 74 engage the bearing recesses 75 and the molten resin material 90 is supplied to the cavity 73. Accordingly, the insulating holder 21 is fixed at a proper position in the cavity 73 during insert molding. Thus, it is possible to reduce the chance of the insulating holder 21 being partially thinned, thereby forming the resin insulation layer 25 having a given thickness at each section. According to the above-described method, it is possible to produce the centralized distribution unit 17 of a thin brushless motor for a vehicle having superior waterproof-ness and airtight-ness functions, and high dielectric strength.

(2) In the above-described embodiment, a positioning structure uses not through-holes, but recesses with bottoms. If the holding grooves 23*a*, 23*b*, and 23*c* were holes with no bottoms, it would be necessary to completely fill the holes with the molten resin material 90 during insert molding. In this case, the bus bars 22*a*, 22*b*, and 22*c* would be in direct communication with the exterior of the centralized distribution unit 17 to form an incursion path for moisture or the like, thereby lowering the waterproof-ness and airtight-ness functions significantly. On the contrary, according to the above-described embodiment, there are at least bottom walls between the respective bus bars 22*a*, 22*b*, and 22*c* and the bearing recesses 75. Consequently, the bus bars 22*a*, 22*b*, and 22*c* are not in direct communication with the exterior of the centralized distribution unit 17, thereby maintaining high waterproof-ness, airtight-ness, and dielectric strength.

(3) In the above-described embodiment, tapered ends of the holder support pins 44 engage the bearing recesses 75. Accordingly, this engagement will prevent or reduce movement of the insulating holder 21, thereby fixing the insulating holder 21 at a proper position in the cavity 73. The insulating holder 21 is hard to move in the cavity 73 during insert molding, thereby reducing the chance of the resin insulation layer 25 being partially thinned. It is possible to produce a centralized distribution unit 17 having superior waterproof-ness and airtight-ness functions and high dielectric strength.

(4) The pair of arcuate ribs 76*a* and 76*b* are provided on the bottom surface of the insulating holder 21 so that the ribs enclose the respective bearing recesses 75. This structure makes the virtual depth of each bearing recess 75 larger. The holder support pins 74 will not come out from the bearing recesses 75 inadvertently, and the insulating holder 21 will be hard to move in the cavity 73 during insert molding. If the holder support pins 74 should come out from the bearing recesses 75, the ribs 76*a* and 76*b* can maintain a certain space between the bottom surface of the insulating holder 21 and the bottom surface of the lower forming recess 71*a* in the lower mold member 71. Accordingly, it is possible for the molten resin material 90 to uniformly flow over the whole bottom surface, thereby reliably accomplishing the insert molding. That is, the insulating holder 21 is not exposed from a part of the centralized distribution unit 17 and the resin insulation layer 25 can cover the entire exterior of the insulating holder 21. It is therefore possible to produce a centralized distribution unit 17 having superior waterproof-ness and airtight-ness functions and high dielectric strength.

(5) The notches 77*a* and 77*b* are provided between the ribs 76*a* and 76*b* on the bottom surface of the insulating holder 21. When the holder support pins 74 are retracted during insert molding, the molten resin material 90 easily flows through the notches 77*a* and 77*b* into the bearing recesses 75. Accordingly, the molten resin material 90 can reliably fill the bearing recesses 75, thereby interrupting an incursion path for moisture or the like. It is therefore possible to produce a centralized distribution unit 17 having superior waterproof-ness and airtight-ness functions and high dielectric strength.

(6) In the above-described embodiment, the notches 77*a* and 77*b* are arranged at the opposite positions in the radial direction of the insulating holder 21 so that the notches 77*a* and 77*b* are opposed to the ribs 76*a* and 76*b*, respectively. The molten resin material 90 can flow into the bearing recesses 75 more smoothly than if there were only one notch. The molten resin material 90 flows along the periphery of the insulating holder 21 during insert molding. In view of this fact, if two notches 77*a* and 77*b* are spaced away from each other in the circumferential direction of the insulating holder 21, the molten resin material 90 will smoothly flow along its flow path into the bearing recesses 75.

It will be apparent from the foregoing that, according to the present invention, the bearing recesses 75 can be reliably filled with the molten resin material 90. Accordingly, it is possible to produce a centralized distribution unit 17 having superior waterproof-ness and airtight-ness functions and high dielectric strength.

(7) In the above-described embodiment, since the notches 77*a* and 77*b* become narrower from the outer periphery of the ribs 76*a* and 76*b* to the inner periphery of the ribs, the molten resin material 90 can flow smoothly into the bearing recesses 75. Accordingly, it is possible to produce a centralized distribution unit 17 having superior waterproof-ness and airtight-ness functions and high dielectric strength.

The above-described embodiment of the present invention may be altered in, for example, the following ways:

In the above-described embodiment, the insulating holder 21 is held in the cavity 73 by engagement of the holder support pins 74 with the bearing recesses 75 formed in the bottom surface of the holder 21. However, any type of holder support, including types other than pins, may hold the insulating holder 21.

The notches 77*a* and 77*b* formed in the ribs 76*a* and 76*b* are not limited to the configurations disclosed in the above embodiment. For example, the notches may be formed into right-angled shapes.

The notches 77*a* and 77*b* formed in the ribs 76*a* and 76*b* are not limited to the arrangement in which two notches are spaced away from each other in the circumferential direction of the insulating holder 21. For example, two notches may be disposed in the radial direction of the insulating holder 21.

Two arcuate ribs 76*a* and 76*b* projecting from the bottom surface of the insulating holder 21 partially surround the bearing recesses 75. However, the ribs may alternatively have shapes other than arcuate shapes.

The number of the notches 77*a* and 77*b* formed in the ribs 76*a* and 76*b* may be changed. For example, only one of the notches 77*a* and 77*b* may be provided, if the two ribs 76*a* and 76*b* are changed to a single, C-shaped rib. Alternatively, the notches 77*a* and 77*b* may be provided at three positions, or may be omitted entirely.

In the above-described embodiment, the present invention is applied to a centralized distribution unit 17 of a three-phase thin DC brushless motor 11. The present invention can also be applied to a centralized distribution unit of a more-than-three-phase (or less-than-three-phase) motor. In conjunction with this alteration, the numbers of the bus bars and holding grooves can be allowed to increase or decrease as appropriate.

From the foregoing description, technical concepts including the following may be appreciated.

(1) In a method for producing a centralized distribution unit of a thin brushless motor for a vehicle, notches are arranged at two positions spaced in the circumferential direction of the insulating holder so that the notches are opposed to each other. Accordingly, it is possible to reliably produce a centralized distribution unit of a thin brushless motor for a vehicle having superior waterproof-ness and airtight-ness functions and high dielectric strength.

(2) In a method for producing a centralized distribution unit of a thin brushless motor for a vehicle, when ribs are provided surrounding support pin engaging holes in an insulating holder, and when notches formed in the ribs become narrower from the outer periphery to the inner periphery, it is possible to reliably produce a centralized distribution unit of a thin brushless motor for a vehicle having superior waterproof-ness and airtight-ness functions and high dielectric strength.

While the invention has been described in conjunction with the specific embodiments described above, many equivalent alternatives, modifications and variations may become apparent to those skilled in the art when given this disclosure. Accordingly, the exemplary embodiments of the invention as set forth above are considered to be illustrative and not limiting. Various changes to the described embodiments may be made without departing from the spirit and scope of the invention.

The entire disclosure of Japanese Patent Application No. 2001-330030 filed on Oct. 26, 2001 including the specification, claims, drawings and summary is incorporated herein by reference in its entirety.

What is claimed is:

1. A method for producing a centralized distribution unit of a thin brushless motor for a vehicle wherein said centralized distribution unit is formed into a ring configuration and can concentratedly distribute current to stator windings, and said centralized distribution unit comprises: a plurality of bus bars, each of which includes a terminal portion to be connected to a battery and tabs to be connected to said stator windings, and is provided in conjunction with a phase of said motor; an insulating holder having holding grooves that hold said respective bus bars and maintain a spacing between the bus bars, bearing recesses being provided in a bottom surface of said insulating holder beforehand; and a resin insulation layer formed by insert-molding that covers said bus bars and said insulating holder, said method comprising the steps of:

disposing said insulating holder and said bus bars in a molding cavity in an insert-molding mold;

engaging distal ends of holder supports that project from an inner wall of a first mold member of the insert-molding mold with said bearing recesses; and supplying a resin that forms said resin insulation layer into said molding cavity.

2. The method according to claim 1, wherein said holder supports are holder support pins having tapered ends.

3. The method according to claim 2, wherein said bearing recesses are enclosed by ribs projecting from said bottom surface and each of said ribs is provided with a notch.

4. The method according to claim 1, wherein a second mold member of the insert-molding mold is provided with mold member supports that are movable into and out from an inner surface of the molding cavity, the method further comprising the step of moving the mold member supports out from the inner surface of the molding cavity to push against at least one of (a) a surface of the insulating holder and (b) a surface of the bus bars.

5. The method according to claim 4, wherein the insulating holder includes a plurality of walls defining said holding grooves, and the mold member supports push against a top end surface of at least one of the walls.

6. The method according to claim 5, wherein the mold member supports include at least one groove formed in an end surface of the mold member supports, the at least one groove engaging a top edge of the at least one of the walls when the mold member supports push against the top end surface of at least one of the walls.

7. The method according to claim 4, further comprising retracting the holder supports and the mold member supports away from the insulating holder after supplying an initial quantity of the resin into the molding cavity, such that the resin flows into spaces previously occupied by the holder supports and the mold member supports.

8. The method of claim 1, wherein the insulating holder includes a plurality of positioning projections, and distal ends of the position projections come into contact with an inner surface of the mold cavity during the step of disposing said insulating holder and said bus bars in the molding cavity.

* * * * *